United States Patent
Kushner et al.

(10) Patent No.: US 8,516,034 B1
(45) Date of Patent: Aug. 20, 2013

(54) SYSTEM AND METHOD FOR MODIFYING APPLICATION BEHAVIOR BASED ON NETWORK BANDWIDTH

(75) Inventors: Gary Kushner, San Francisco, CA (US); Farhad Safinia, New York, NY (US)

(73) Assignee: Good Technology Software, Inc, Wilmington, DE (US)

( * ) Notice: Subject to any disclaimer, the term of this patent is extended or adjusted under 35 U.S.C. 154(b) by 1818 days.

(21) Appl. No.: 10/191,093

(22) Filed: Jul. 8, 2002

(51) Int. Cl.
*G06F 15/16* (2006.01)

(52) U.S. Cl.
USPC .......... 709/203; 709/208; 709/217; 709/224

(58) Field of Classification Search
USPC ......... 709/203, 217, 218, 219, 220, 232–235, 709/208; 370/468; 707/10; 715/749; 382/305
See application file for complete search history.

(56) References Cited

U.S. PATENT DOCUMENTS

| | | |
|---|---|---|
| 4,682,150 A | 7/1987 | Mathes et al. |
| 5,049,881 A | 9/1991 | Gibson et al. |
| 5,115,392 A | 5/1992 | Takamoto et al. |
| 5,126,739 A | 6/1992 | Whiting et al. |
| 5,159,592 A | 10/1992 | Perkins |
| 5,321,840 A | 6/1994 | Ahlin et al. |
| 5,469,161 A | 11/1995 | Bezek |
| 5,521,597 A | 5/1996 | Dimitri |
| 5,553,281 A | 9/1996 | Brown et al. |
| 5,559,800 A | 9/1996 | Mousseau et al. |
| 5,563,595 A | 10/1996 | Strohacker |
| 5,666,530 A | 9/1997 | Clark et al. |
| 5,715,387 A | 2/1998 | Barnstijn et al. |
| 5,727,159 A | 3/1998 | Kikinis |
| 5,727,202 A | 3/1998 | Kucala |
| 5,760,716 A | 6/1998 | Mathews et al. |
| 5,771,010 A | 6/1998 | Masenas |
| 5,790,974 A | 8/1998 | Tognazzini |
| 5,793,970 A | 8/1998 | Fakes et al. |
| 5,802,312 A | 9/1998 | Lazaridis et al. |
| 5,841,376 A | 11/1998 | Hayashi |
| 5,870,610 A | 2/1999 | Beyda |
| 5,875,329 A | 2/1999 | Shan |
| 5,903,230 A | 5/1999 | Masenas |
| 5,930,471 A | 7/1999 | Milewski et al. |
| 5,961,590 A | 10/1999 | Mendez et al. |

(Continued)

FOREIGN PATENT DOCUMENTS

| | | |
|---|---|---|
| EP | 0666651 | 8/1995 |
| EP | 0909037 | 4/1999 |

(Continued)

OTHER PUBLICATIONS

PCT International Search Report, PCT/US03/12799, mailed Jul. 28, 2003.

(Continued)

*Primary Examiner* — Yves Dalencourt
(74) *Attorney, Agent, or Firm* — Knobbe, Martens, Olson & Bear, LLP

(57) ABSTRACT

A system and method facilitate modifying behavior of an application coupled to a device and a server based on bandwidth. The method determines a first bandwidth state. A change is then detected from the first bandwidth state to a second bandwidth state. Subsequently, the behavior of an application is changed based on bandwidth parameters of the second bandwidth state.

15 Claims, 15 Drawing Sheets

(56) References Cited

U.S. PATENT DOCUMENTS

| | | | | |
|---|---|---|---|---|
| 5,974,238 | A | 10/1999 | Chase, Jr. | |
| 5,987,464 | A | 11/1999 | Schneider | |
| 6,003,089 | A | 12/1999 | Shaffer et al. | |
| 6,023,708 | A | 2/2000 | Mendez et al. | |
| 6,034,621 | A | 3/2000 | Kaufman | |
| 6,052,735 | A | 4/2000 | Ulrich et al. | |
| 6,065,017 | A | 5/2000 | Barker | |
| 6,104,392 | A * | 8/2000 | Shaw et al. | 715/749 |
| 6,111,707 | A | 8/2000 | Buddecke et al. | |
| 6,151,606 | A | 11/2000 | Mendez | |
| 6,182,117 | B1 | 1/2001 | Christie et al. | |
| 6,216,157 | B1 * | 4/2001 | Vishwanath et al. | 709/208 |
| 6,218,970 | B1 | 4/2001 | Jaquette | |
| 6,219,694 | B1 | 4/2001 | Lazaridis et al. | |
| 6,226,618 | B1 | 5/2001 | Downs | |
| 6,259,891 | B1 | 7/2001 | Allen | |
| 6,275,848 | B1 | 8/2001 | Arnold | |
| 6,279,001 | B1 * | 8/2001 | DeBettencourt et al. | 707/10 |
| 6,304,881 | B1 | 10/2001 | Halim et al. | |
| 6,310,889 | B1 * | 10/2001 | Parsons et al. | 370/466 |
| 6,330,618 | B1 | 12/2001 | Hawkins et al. | |
| 6,343,299 | B1 | 1/2002 | Huang et al. | |
| 6,347,340 | B1 | 2/2002 | Coelho et al. | |
| 6,360,272 | B1 | 3/2002 | Lincke et al. | |
| 6,384,850 | B1 | 5/2002 | McNally et al. | |
| 6,393,434 | B1 | 5/2002 | Huang et al. | |
| 6,396,482 | B1 | 5/2002 | Griffin et al. | |
| 6,401,136 | B1 | 6/2002 | Britton et al. | |
| 6,430,601 | B1 | 8/2002 | Eldridge et al. | |
| 6,449,622 | B1 | 9/2002 | LaRue et al. | |
| 6,457,062 | B1 | 9/2002 | Pivowar et al. | |
| 6,460,055 | B1 | 10/2002 | Midgley et al. | |
| 6,463,463 | B1 | 10/2002 | Godfrey et al. | |
| 6,463,464 | B1 | 10/2002 | Lazaridis et al. | |
| 6,477,543 | B1 | 11/2002 | Huang et al. | |
| 6,505,055 | B1 | 1/2003 | Kahn et al. | |
| 6,535,892 | B1 | 3/2003 | LaRue et al. | |
| 6,571,245 | B2 | 5/2003 | Huang et al. | |
| 6,604,236 | B1 | 8/2003 | Draper et al. | |
| 6,615,253 | B1 | 9/2003 | Bowman-Amuah | |
| 6,625,621 | B2 | 9/2003 | Tan et al. | |
| 6,636,873 | B1 | 10/2003 | Carini et al. | |
| 6,640,244 | B1 | 10/2003 | Bowman-Amuah | |
| 6,654,746 | B1 | 11/2003 | Wong et al. | |
| 6,658,167 | B1 * | 12/2003 | Lee et al. | 382/305 |
| 6,671,757 | B1 | 12/2003 | Multer et al. | |
| 6,694,335 | B1 | 2/2004 | Hopmann et al. | |
| 6,697,458 | B1 | 2/2004 | Kunjibettu | |
| 6,701,378 | B1 | 3/2004 | Gilhuly et al. | |
| 6,721,787 | B1 | 4/2004 | Hiscock | |
| 6,721,871 | B2 | 4/2004 | Piispanen et al. | |
| 6,757,698 | B2 | 6/2004 | McBride et al. | |
| 6,779,019 | B1 | 8/2004 | Mousseau et al. | |
| 6,792,085 | B1 | 9/2004 | Rigaldies et al. | |
| 6,874,037 | B1 | 3/2005 | Abram et al. | |
| 6,901,415 | B2 | 5/2005 | Thomas et al. | |
| 6,907,243 | B1 * | 6/2005 | Patel | 455/442 |
| 6,931,454 | B2 | 8/2005 | Deshpande et al. | |
| 6,934,766 | B1 | 8/2005 | Russell | |
| 6,941,348 | B2 | 9/2005 | Petry et al. | |
| 6,941,349 | B2 | 9/2005 | Godfrey et al. | |
| 6,954,789 | B2 * | 10/2005 | Dietz et al. | 709/224 |
| 6,973,299 | B2 | 12/2005 | Apfel | |
| 6,983,308 | B1 | 1/2006 | Oberhaus et al. | |
| 7,003,776 | B2 | 2/2006 | Sutherland | |
| 7,085,809 | B2 * | 8/2006 | Mori et al. | 709/203 |
| 7,092,699 | B1 | 8/2006 | Hefter | |
| 7,136,934 | B2 | 11/2006 | Carter et al. | |
| 7,139,555 | B2 | 11/2006 | Apfel | |
| 7,149,813 | B2 | 12/2006 | Flanagin et al. | |
| 7,155,483 | B1 | 12/2006 | Friend et al. | |
| 7,185,082 | B1 * | 2/2007 | del Val et al. | 709/224 |
| 2001/0004744 | A1 | 6/2001 | Lazaridis et al. | |
| 2001/0005864 | A1 | 6/2001 | Mousseau et al. | |
| 2001/0010059 | A1 * | 7/2001 | Burman et al. | 709/224 |
| 2001/0034654 | A1 | 10/2001 | Vigil et al. | |
| 2001/0044835 | A1 * | 11/2001 | Schober et al. | 709/217 |
| 2001/0054115 | A1 | 12/2001 | Ferguson et al. | |
| 2002/0013853 | A1 | 1/2002 | Baber et al. | |
| 2002/0019225 | A1 | 2/2002 | Miyashita | |
| 2002/0032722 | A1 | 3/2002 | Baynes et al. | |
| 2002/0046286 | A1 | 4/2002 | Caldwell et al. | |
| 2002/0085719 | A1 * | 7/2002 | Crosbie | 380/248 |
| 2002/0119793 | A1 | 8/2002 | Hronek et al. | |
| 2002/0120696 | A1 | 8/2002 | Mousseau et al. | |
| 2002/0146240 | A1 | 10/2002 | Ogawa et al. | |
| 2002/0160773 | A1 | 10/2002 | Gresham et al. | |
| 2003/0046434 | A1 | 3/2003 | Flanagin et al. | |
| 2003/0050046 | A1 | 3/2003 | Conneely et al. | |
| 2003/0069842 | A1 | 4/2003 | Kight et al. | |
| 2003/0081621 | A1 | 5/2003 | Godfrey | |
| 2003/0097381 | A1 | 5/2003 | Detweiler | |
| 2004/0054739 | A1 | 3/2004 | Friend et al. | |
| 2004/0105423 | A1 | 6/2004 | Koehler et al. | |
| 2004/0109436 | A1 | 6/2004 | Vargas et al. | |
| 2004/0246895 | A1 * | 12/2004 | Feyerabend | 370/229 |
| 2005/0148356 | A1 | 7/2005 | Ferguson et al. | |

FOREIGN PATENT DOCUMENTS

| | | |
|---|---|---|
| EP | 0917077 | 5/1999 |
| EP | 1014629 | 6/2000 |
| WO | WO 00/67158 A | 11/2000 |
| WO | WO 02/19626 A | 3/2002 |

OTHER PUBLICATIONS

EP Search Report, PCT/US0312799, mailed Sep. 15, 2005.

Hild, et al., "Mobilizing Applications", *IEEE Personal Communications*, XP-000721303, (Oct. 1997), 26-34.

* cited by examiner

SYSTEM AND METHOD FOR MODIFYING APPLICATION BEHAVIOR BASED ON NETWORK BANDWIDTH

CROSS-REFERENCES TO RELATED APPLICATIONS

The present invention is related to the following, each of which is incorporated herein by reference in its entirety for all purposes:

U.S. patent application Ser. No. 10/133,817, filed Apr. 24, 2002, entitled "System and Method for Automatically Updating a Wireless Device;"

U.S. patent application Ser. No. 10/171,048, filed Jun. 12, 2002, entitled "Information Repository System Including a Wireless Device and Related Method;" and U.S. Provisional Patent Application Ser. No. 60/384,642, filed May 31, 2002, entitled "System and Method for a Request Queue for a Wireless Device," now abandoned.

BACKGROUND OF THE INVENTION

1. Field of the Invention

The present invention relates generally to wireless communications, and more particularly to a system and method for modifying application behavior based on network bandwidth.

2. Background of the Invention

A variety of businesses have embraced wireless solutions. Enterprise workforces are increasingly mobile and accordingly require access to time-critical data while away from the office. Further, increased globalization and competition requires companies to be more accessible and responsible. Using wireless-enabled "smart devices," mobile workers can make more efficient use of their out-of-office time, thus producing cost savings. Similarly, real-time responsiveness to customer requests may differentiate one enterprise from a competitor, resulting in greater revenue via increased customer sales. Wireless technology provides flexibility with respect to time and place of work to workers in today's market.

Due to the numerous advantages outlined above, wireless technology has been rapidly adopted by enterprises. Increasingly, wireless devices can provide mobile professionals access to corporate resources and applications that are already available to them on desktops. However, handheld wireless device and network limitations can make those applications and resources difficult and expensive to access and use. For example, network bandwidth may change from location to location. One location may exhibit relatively high bandwidth network coverage over a relatively small area for a relatively high cost. Another location may exhibit lower network coverage over a larger area for a lower cost. Various other combinations of network coverage and cost are possible.

SUMMARY OF THE INVENTION

The present invention provides in various embodiments a system and method for modifying application behavior based on network bandwidth.

In a system according to one embodiment of the present invention, a system for modifying application behavior based on bandwidth is provided. The system comprises a device; a server coupled to the device; and an application coupled to the device and configured such that the application behavior changes based on bandwidth parameters of the device.

In a method according to another embodiment of the present invention, the method facilitates modifying behavior of an application coupled to a device and a server based on bandwidth. The method comprises determining a first bandwidth state. A change is then detected from the first bandwidth state to a second bandwidth state. Subsequently, the behavior of an application is changed based on bandwidth parameters of the second bandwidth state.

A further understanding of the nature and advantages of the inventions herein may be realized by reference to the remaining portions of the specification and the attached drawings.

DESCRIPTION OF THE SPECIFIC EMBODIMENTS

Figure 1:
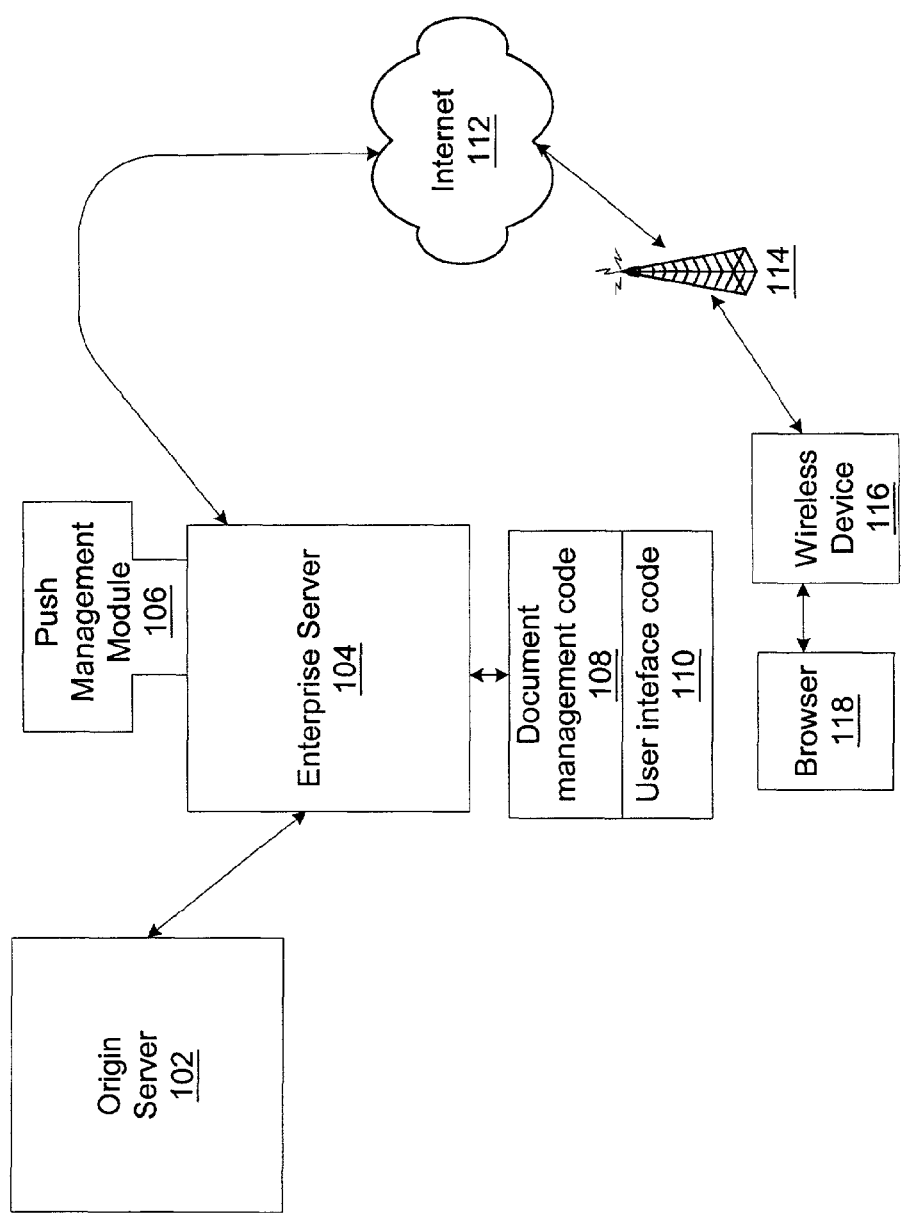
FIG. 1 is a schematic drawing of an exemplary architecture, in accordance with an embodiment of the present invention.

As shown in the exemplary drawings wherein like reference numerals indicate like or corresponding elements among the figures, an embodiment of a system according to the present invention will now be described in detail. The following description sets forth an example of a system and method for updating a wireless device.

Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Wireless devices are widely used in today's world. Accordingly, there is a need for a variety of wireless solutions. The present system solves the problem of constantly synching one's wireless device with their fixed computing device by automatically forwarding information related to a change(s), such as an addition, a deletion, or any other modification to folders, subfolders, files etc., at the fixed computing device. Accordingly, a user can expect his or her wireless device to automatically be updated utilizing the system and method of the present invention.

One way the present system fulfills current needs is by adding push support to enterprise applications. Information related to updates is automatically pushed to users' wireless devices. Accordingly, workers are provided with up-to-date information without having to incessantly seek out such information. The present invention eliminates the need for manual synching, and assures that information is sent and received transparently.

Referring now to the drawings, FIG. 1 is a schematic drawing of an exemplary architecture in accordance with an embodiment of the present invention. In the example, origin server 102 is coupled to enterprise server 104 to allow for the exchange(s) of data between the two servers. Enterprise server 104 is coupled to push management module (PMM) 106, document management code module 108, and user interface code module 110. Further, data from enterprise server 104 may be forwarded to wireless device 116 via transmission medium 114 by way of a wide area network, such as Internet 112, as shown. Wireless device 116 includes browser 118. A wireless device may include any wireless device that communicates via a wireless network, such as a Palm Pilot™, a "smart phone," a RIM™ device, etc. In one embodiment, wireless device 116 may be a portable wireless device. It is also contemplated that in alternative embodiments, other devices that may or may not be wireless may be used in accordance with embodiments of the present invention.

Enterprise server 104 may be representative of a server computer in an enterprise environment. For example, a corporation may provide wireless services to its employees utilizing the present system, including enterprise server 104. In an exemplary embodiment of the present invention, enterprise server 104 resides behind a corporate firewall to ensure the secure transmission of data.

Origin server 102 may represent any source of information external to a company hosting enterprise server 104 or internal to a company hosting enterprise server 104. Although origin server 102 is not requisite, such a server is often coupled to a company's enterprise server to provide information.

Enterprise server 104 is coupled to origin server 102 in the example shown to facilitate data exchange(s). However, enterprise server 104 may be coupled to any type of source suitable for use with the present system. Further, enterprise server 104 may serve as the primary origin of data, in which case it may not be coupled to any type of source server at all.

PMM 106 may represent a plug-in application, a general application program, or any other component of enterprise server 104 suitable for use with the present system. PMM 106 is software that attaches/plugs-in to enterprise server 104 to provide basic push capabilities. PMM 106 makes it possible for an application to send secure messages to wireless device 116 without waiting for a user to send a request. Accordingly, useful information can be sent to the user's wireless device 116 in advance of when the information is needed or requested. Thus, when the user needs the information, the information is already present. Accordingly, no time is lost in sending a request (e.g., a hypertext transfer protocol (HTTP) request, etc.) from wireless device 116 to enterprise server 104 and waiting for data to return to wireless device 116. Further, the data on the user's wireless device 116 is the most up-to-date information available.

Document management code module 108 may also be a plug-in application, a general application program, firmware, or any other component associated with enterprise server 104 that is suitable for use with the present system. Document management code 108 communicates with PMM 106 in an exemplary embodiment according to the present invention.

PMM 106 may communicate the information to enterprise server 104 while providing an alert that information is being forwarded. Information can include documents, alerts or any other type of information suitable for use with the present system. For example, new files, deleted files, change(s) to files, directories, set of files, etc. Another such example is applications. The information may be forwarded to the server without any type of alert. Thus, the information can be sent transparently.

Further, the information may be sent as an alert to wireless device 116. Therefore, when the information arrives at the user's wireless device 116, the user is notified of its arrival. In one embodiment, in a similar way a user is notified of an electronic mail (E-mail) message. For example, if wireless device 116 is configured to beep three times for E-mail, it can do the same when information with an alert arrives. A notification may also be displayed on a screen of wireless device 116 when the information arrives. However, if no alert accompanies the information, the information can be saved as a message for viewing at a later time, but the user is not immediately notified of the arrival of the information (document, etc.) in this embodiment.

In an exemplary embodiment according to the present invention, user interface code module 110 is an application on enterprise server 104. However, user interface code module 110 may be an application residing elsewhere provided module 110 is coupled to enterprise server 104 via a network. For example, user interface code module 110 may reside on a user computer, a separate computer associated with the user such as a computer of an information technology (IT) manager, etc. As will be discussed in further detail, the user can modify existing files, add files, etc. utilizing user interface code module 110.

Utilizing enterprise server 104, PMM 106 forwards information to wireless device 116 via Internet 112, or another suitable network, by way of wireless transmission medium 114. PMM 106 can check for network connectivity and will transmit the information to wireless device 116 by way of enterprise server 104 when a connection is secured.

An exemplary system and method utilizing the architecture described herein will now be discussed. In a system and method according to one embodiment of the present invention, it is determined whether one or more changes have occurred to a set of files. The set of files may include a file system and/or a directory structure. The set of files may reside on a server, a user computer, and/or a separate computer associated with the user (e.g., a computer of a manager of the user company, etc.). The one or more changes to the set of files may include adding a file to the set of files, deleting a file from the set of files, modifying a file in the set of files, or changing the set of files themselves, such as by renaming a file, etc. The set of files includes one or more files. Information related to the one or more changes is received and automatically forwarded to wireless device 116. In one embodiment, a unique identifier is assigned to the information related to the one or more changes. Further, the information associated with the one or more changes can be manipulated. One or more files on wireless device 116 are automatically updated to reflect the one or more changes in the set of files utilizing the information. One specific exemplary implementation of such functionality will be set forth with reference to FIG. 4. In one embodiment, a notification of the one or more changes is forwarded to wireless device 116.

In another embodiment, the set of files are periodically accessed in order to determine whether the one or more changes to the set of files has occurred. In another embodiment, it may be determined whether the one or more changes to the set of files is related to a predetermined group associated with the set of files (e.g., sales division, engineering department, etc.). The information associated with the one or more changes can then be conditionally forwarded to the wireless device based on the predetermined group (e.g., technical specifications are only forwarded to users that are part of the engineering department).

As discussed herein, the change(s) may include, inter alia, modifying the one or more files in the set of files, in which case the modified file can be re-pushed to wireless device 116 with the same unique identifier (such as a global unique identifier (GUID), etc.). The modified file may essentially overwrite the previously un-modified file. Thus, the modifications to the one or more files essentially creates a new file that replaces the one or more existing files.

Notification of the change(s), or any other type of change(s), may be forwarded to enterprise server 104. Further, notification of the change(s) and the update associated with the change(s) may be forwarded to the user via wireless device 116 associated with the user, or any other user interface, such as a computing device of the IT manager, etc. Enterprise server 104 and/or the user may register with the set of files to be notified of a change(s) to the set of files. In one embodiment, enterprise server 104 periodically accesses the set of files in order to determine whether a change(s) to the one or more files in the directory has occurred. In an alternative embodiment, enterprise server 104 is adapted for manipulating the information associated with the change(s), such as processing the information by changing its configuration, adding headers to the information, or any other type of manipulation of the information that may be suitable. In another embodiment, one or more modules are associated with enterprise server 104 for manipulating the information.

As discussed herein, a unique identifier (e.g., GUID, etc.) may be assigned with the information associated with the change(s). Assignment of a unique identifier may be done for tracking purposes, for example. As noted, a new unique identifier may be associated with a new or existing file, or an existing unique identifier may continue to be associated with an existing file, even though the existing file may be modified and replaced by the modified file.

Figure 2:
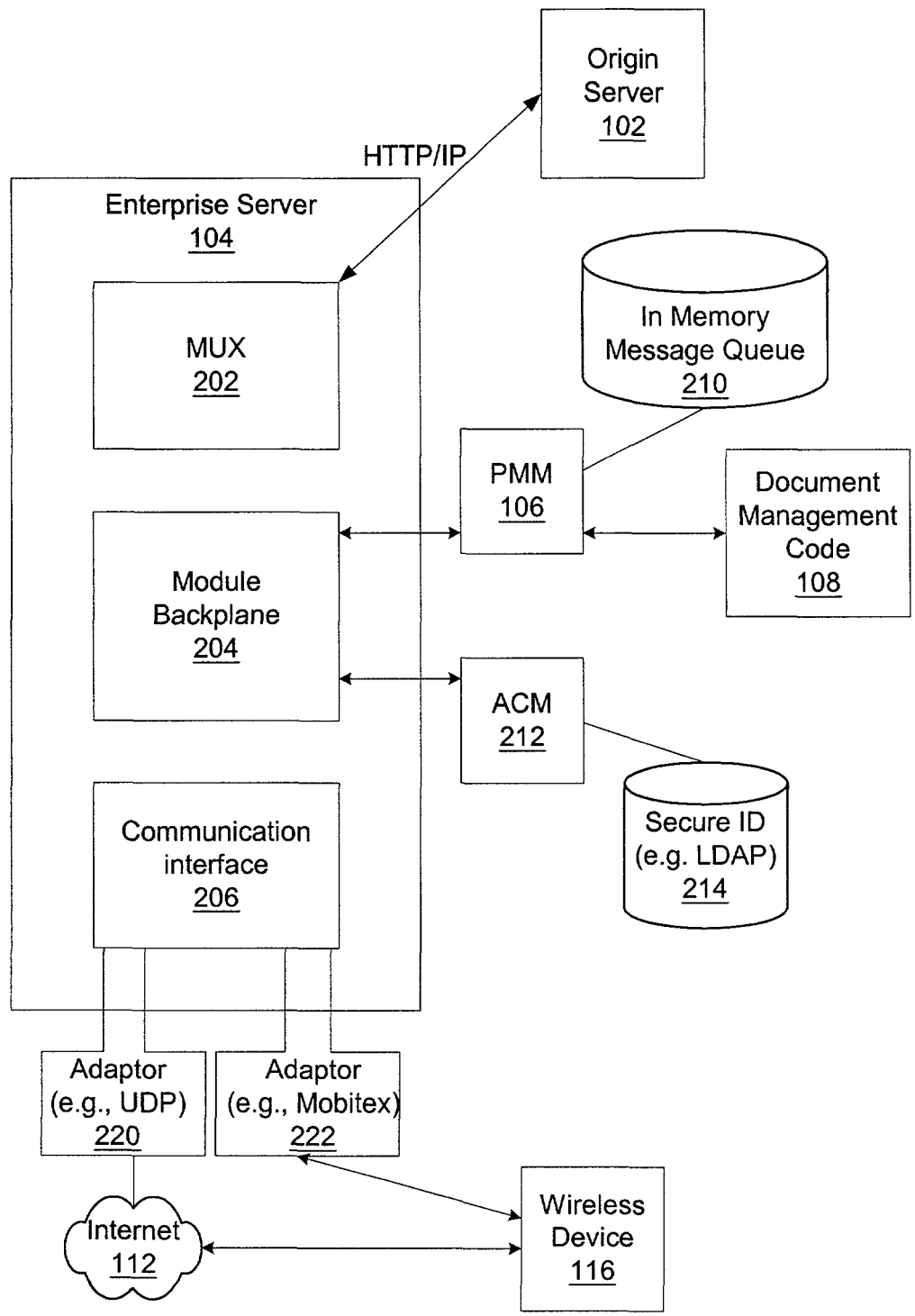
FIG. 2 is a schematic diagram illustrating an exemplary architecture of an enterprise server in relation to other elements that may be associated therewith, in accordance with an embodiment of the present invention.

In further keeping with some embodiments according to the present invention, FIG. 2 is a schematic diagram illustrating exemplary architecture of enterprise server 104 in relation to other elements that may be associated therewith. As previously discussed, enterprise server 104 may be connected to origin server 102, as well as PMM 106.

Enterprise server 104 may include multiplexer (MUX) module 202 for multiplexing data signals. Module platform 204 and communication interface module 206 may also be included as part of enterprise server 104. Module platform 204 may be connected to various additional modules. In FIG. 2, PMM 106 and Access Control Module (ACM) 212 are illustrated as examples of modules that may be connected to module backplane 204 of enterprise server 104. ACM 212 controls what areas of an application/web site are accessible by what users. The modules may include databases associated therewith, such as databases 210 and 214 indicated in FIG. 2. An example of Secure ID database 214 may include Lightweight Directory Access Protocol (LDAP), for example. As discussed herein, PMM 106 may be responsible for notifying document management code module 108 of a change(s) to the set of files.

Communications interface module 206 may include and/or be coupled to adaptor 222 for communicating with wireless device 116. An example of such an adaptor is commonly known as "Mobitex." Communication to wireless device 116 may be accomplished utilizing another type of adaptor, such as user datagram protocol (UDP) 220 via the Internet 112, utilizing Internet protocol (IP), or by any other suitable means.

MUX module 202 may represent a hard-wired module with direct connectivity to some type of source, such as origin server 102 shown in FIG. 2. Further, information flows to and from MUX module 202 from communication interface 206 and may be manipulated by module backplane 204, which may include various modules, as discussed herein.

PMM 106 monitors ports for pushing requests. Information may be pushed from document management code module 108 to wireless device 116 via PMM 106 and enterprise server 104. Conversely, wireless device 116 may provide information to user interface code module 110 via document management code module 108, which may receive the information from enterprise server 104 via PMM 106.

Document management code module 108 is capable of communicating with any PMM 106. For example, PMM 106 of a server other than enterprise server 104 may receive communications from document management code module 108.

In one embodiment, the set of files includes a file system that in turn includes one or more directory structures. The directory structures can be created either on enterprise server 104 directly, or via user interface code module 110. The directory structures may include a hierarchical structure, including folders, subfolders, etc. For example, a form library may be organized utilizing the directory structure(s). When a user adds to, deletes, or otherwise modifies files within the directory structure(s), the activity is communicated to document management code module 108. Document management code module 108 may utilize PMM 106 to provide an alert associated with information relating to the addition and/or modification, or the information may be transmitted transparently, without using an alert. PMM 106 forwards the information to enterprise server 104, which sends the updated information to a wireless device of the user, such as wireless device 116. Browser 118 on wireless device 116 monitors communications related to the information. Accordingly, one or more files on wireless device 116 are automatically updated with the information that has been pushed to wireless device 116 via enterprise server 104.

Figure 3:
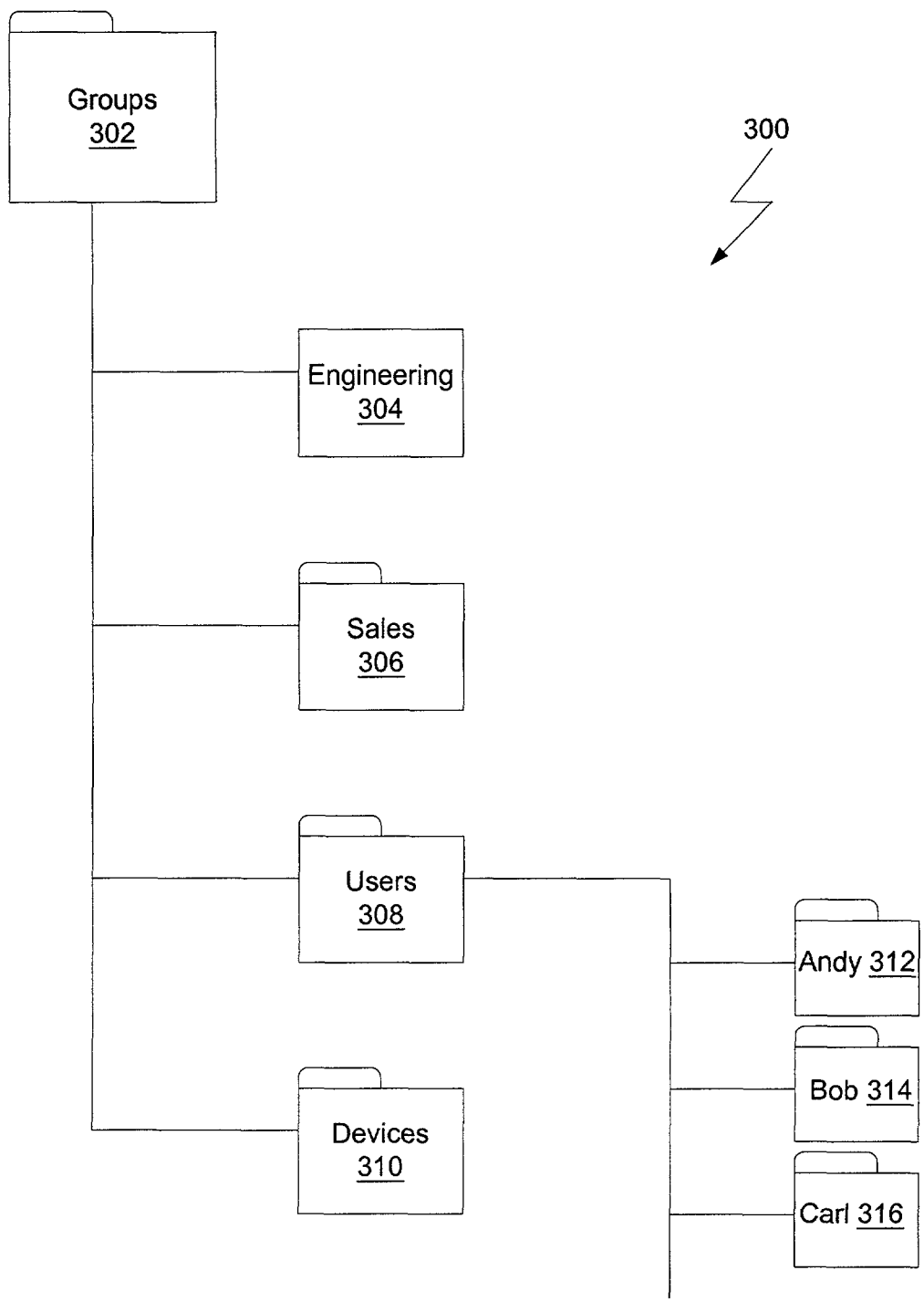
FIG. 3 is a schematic diagram of an exemplary directory structure, in accordance with an embodiment of the present invention.

Referring now to FIG. 3, an exemplary directory structure 300 is illustrated in accordance with an embodiment of the present invention. As indicated in FIG. 3, group's folder 302 may include various subfolders, such as engineering subfolder 304, sales subfolder 306, users subfolder 308 and devices subfolder 310. Groups folder 302 may include subfolders further including predetermined groups, for example, as discussed herein. FIG. 3 also illustrates that the subfolders 304, 306, 308 and 310 may include further subfolders. For example, the users folder 308 may include folders for Andy 312, Bob 314 and Carl 316. The folders may include user lists for forwarding updated information to users on the list. Various other folders and subfolders may be included. As another example, a subfolder labeled "All" may be included, the subfolder including files pertaining to all users. In a typical user interface environment, a user may drag and drop a file from one folder to the next, or from an outside source into a folder within directory structure 300. A user may also drag and drop folders and subfolders. When such a folder is moved or added, or a file within directory structure 300 is otherwise modified, the information is transmitted to one or more wireless devices, such as wireless device 116, associated with the user in order to update the one or more wireless devices.

Each folder has associated with it a set of wireless devices 116 that will receive updates. This association is stored in a configuration file or database. In one embodiment, as long as the association is maintained, changing the name of a directory does not need to change which wireless devices 116 are associated with which directory. Often, however, the interface code will maintain logical mapping between the folder names and which wireless devices 116 the folder is associated with. For example, the user name might be the same as the folder name. In that case, if the folder name changes then the folder would be associated with a different user name. This kind of mapping is not necessary, however.

As discussed herein, a set of files may include a file system and/or directory structure, such as directory structure 300. Generally, file systems and directory structures represent user interaction modes. Any mode of user interaction suitable for use with the present system may be employed. For example, a web interface, file transfer protocol (FTP) interface, a machine-to-machine interface, such as simple object access protocol (SOAP), etc., may also be utilized to enable user interaction.

Figure 4:
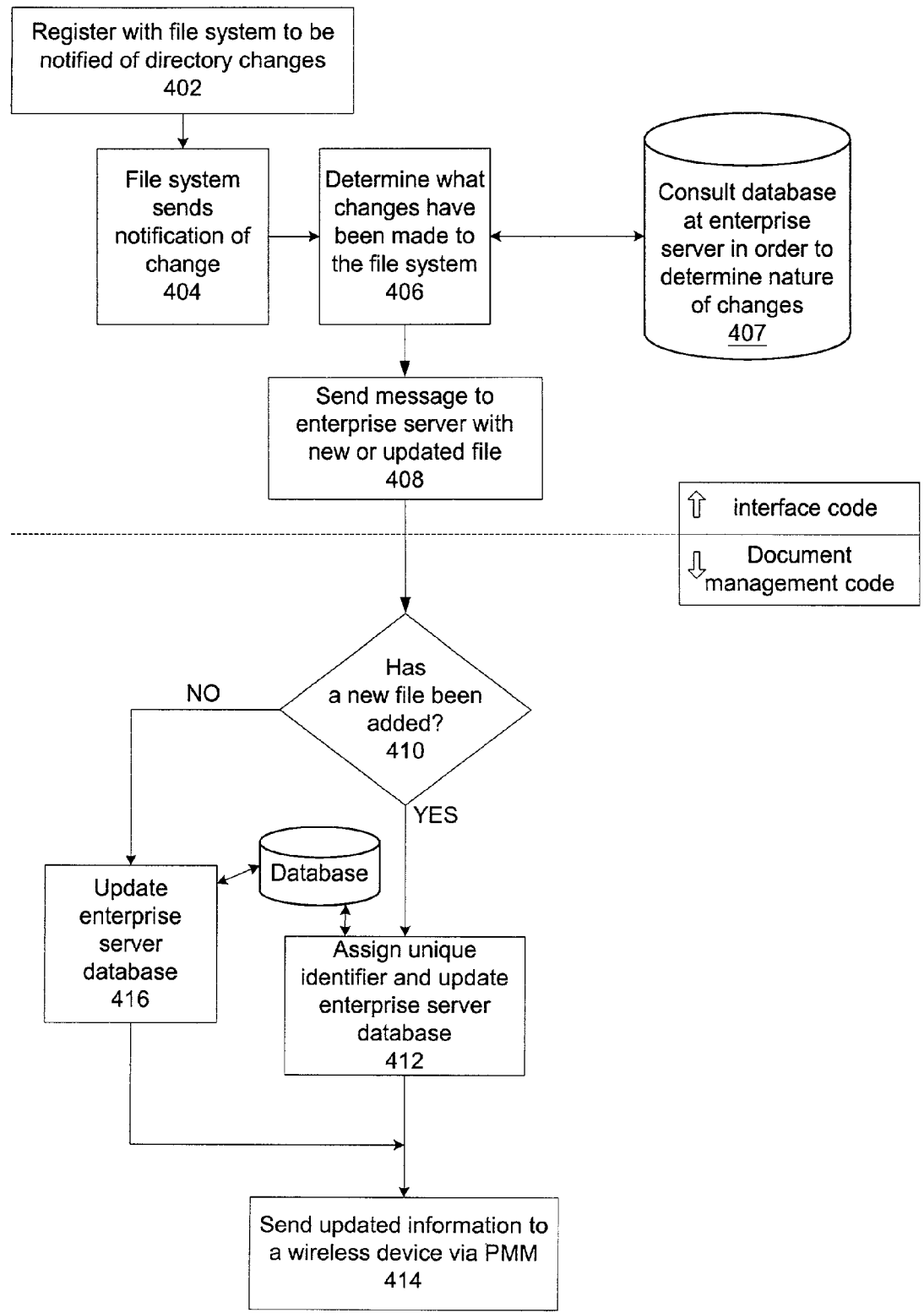
FIG. 4 is a flowchart illustrating an exemplary process for identifying a change(s) to the file system.

In order to update wireless device 116 of the user, the nature of the change(s) to the set of files is determined. FIG. 4 illustrates how a change(s) to one or more files in directory structure 300 associated with a file system on enterprise server 104 are determined. In FIG. 4, the illustration exemplifies a set of files that includes a file system, the file system creating a directory structure, referred to simply as a directory in FIG. 4. A flowchart illustrating a process for identifying a change(s) to the one or more files in the directory in accordance with an embodiment of the present invention is shown.

At step 402, the user registers with the file system, via a user interface, such as user interface code module 110, to be notified of a change(s). At step 404, the file system sends notification of a change(s) to the one or more files in directory structure 300. At step 406, user interface code module 110 determines what change(s) has occurred to directory structure 300 by consulting database 407. At step 408, a message is sent to the server with the new or updated file information. At step 410, it is determined whether a new file was added. If a new file was added, a unique identifier is assigned and the database is updated therewith at step 412. The updated information is forwarded to the device via PMM 106, or any other suitable push mechanism, at step 414. If a new file was not added, the database is updated with the information associated with the change(s) at step 416, and the information is forwarded to wireless device 116 at step 414.

The process described above is a notification process. Thus, when a user makes a change(s) that affects directory structure 300, the file system notifies enterprise server 104 of the change(s). This alert indicates to enterprise server 104 that action can be taken in response to the change(s). In other words, enterprise server 104 can determine the nature of the change(s) that occurred and forward the change(s) to wireless device 116 of the user.

Figure 5:
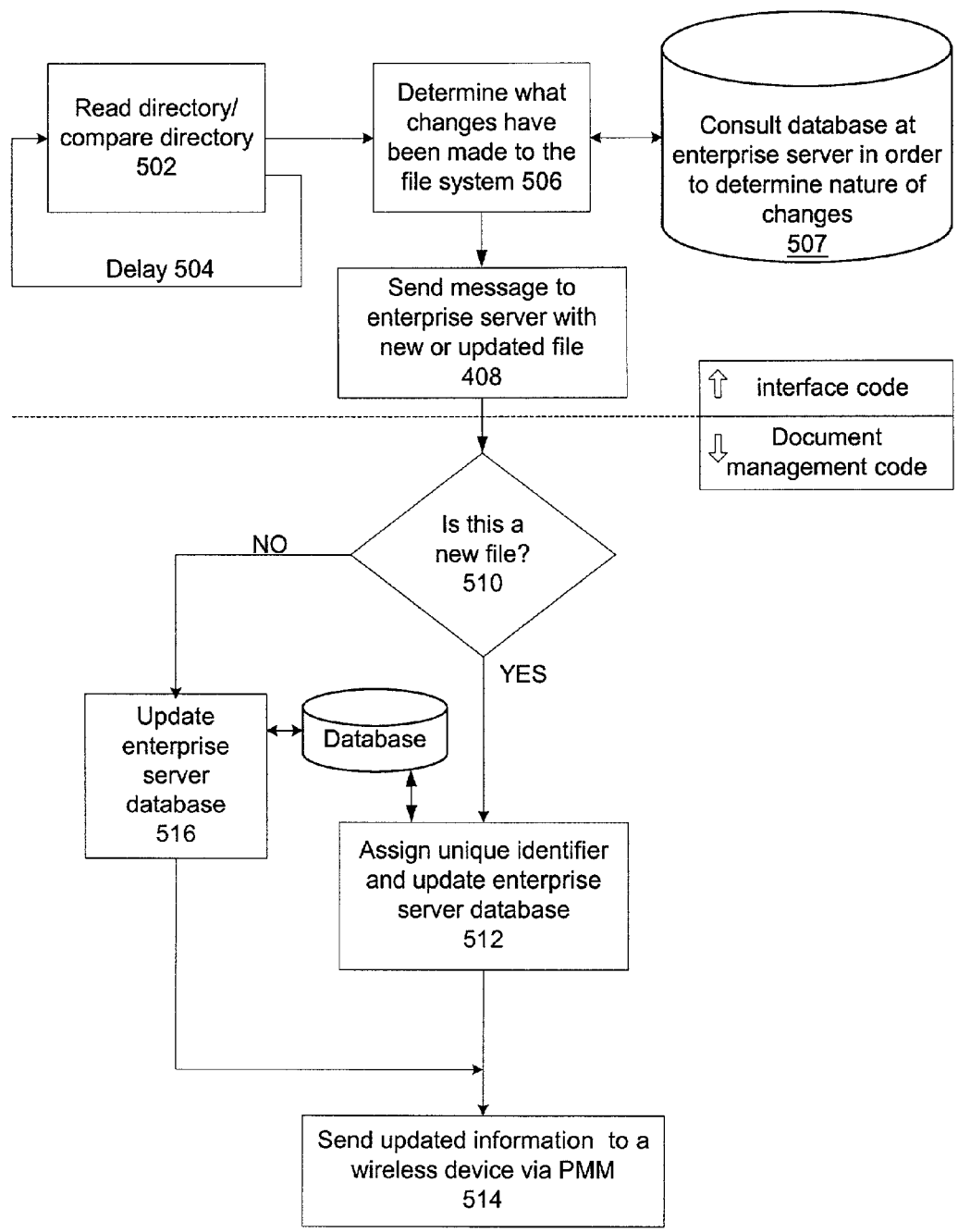
FIG. 5 is a flowchart illustrating an alternative exemplary process for monitoring a file system change(s).

FIG. 5 is a flowchart illustrating an alternative process for monitoring a change(s) to a set of files in accordance with an embodiment of the present invention. At step 502, enterprise server 104 periodically reads directory structure 300 associated with the file system. A delay results at step 504, which may be scheduled. The delay may be shortened or lengthened to adjust the frequency with which the directory is accessed. At step 506, directory structure 300 is checked for a change(s) that may have occurred since the previous time directory structure 300 was read. Database 507 may be accessed during this step to determine the nature of any change(s) that may have occurred. As in FIG. 4, it is determined whether a new file was added at step 510. If a new file was added, a unique identifier is assigned and the database is updated at step 512. The information associated with the new file is forwarded to wireless device 116 at step 514, via PMM 106 or any other suitable push mechanism. If the change(s) does not include the addition of a new file to the file system, the database is updated with the change(s) at step 516 and the information is sent to wireless device 116 at step 514.

As previously discussed herein, directory structure 300 may be created on enterprise server 104. However, directory structure 300 may also be created on a computer of the user, or a computer otherwise associated with the user, such as the computer of a manager employed by, affiliated with, etc., a user company, for instance. Where directory structure 300 is created on a user company computer and it resides on the user company computer, the file system will check directory structure 300 on the user computer company computer for a change(s) and the file system will notify enterprise server 104 of a change(s) to directory structure 300.

Figure 6:
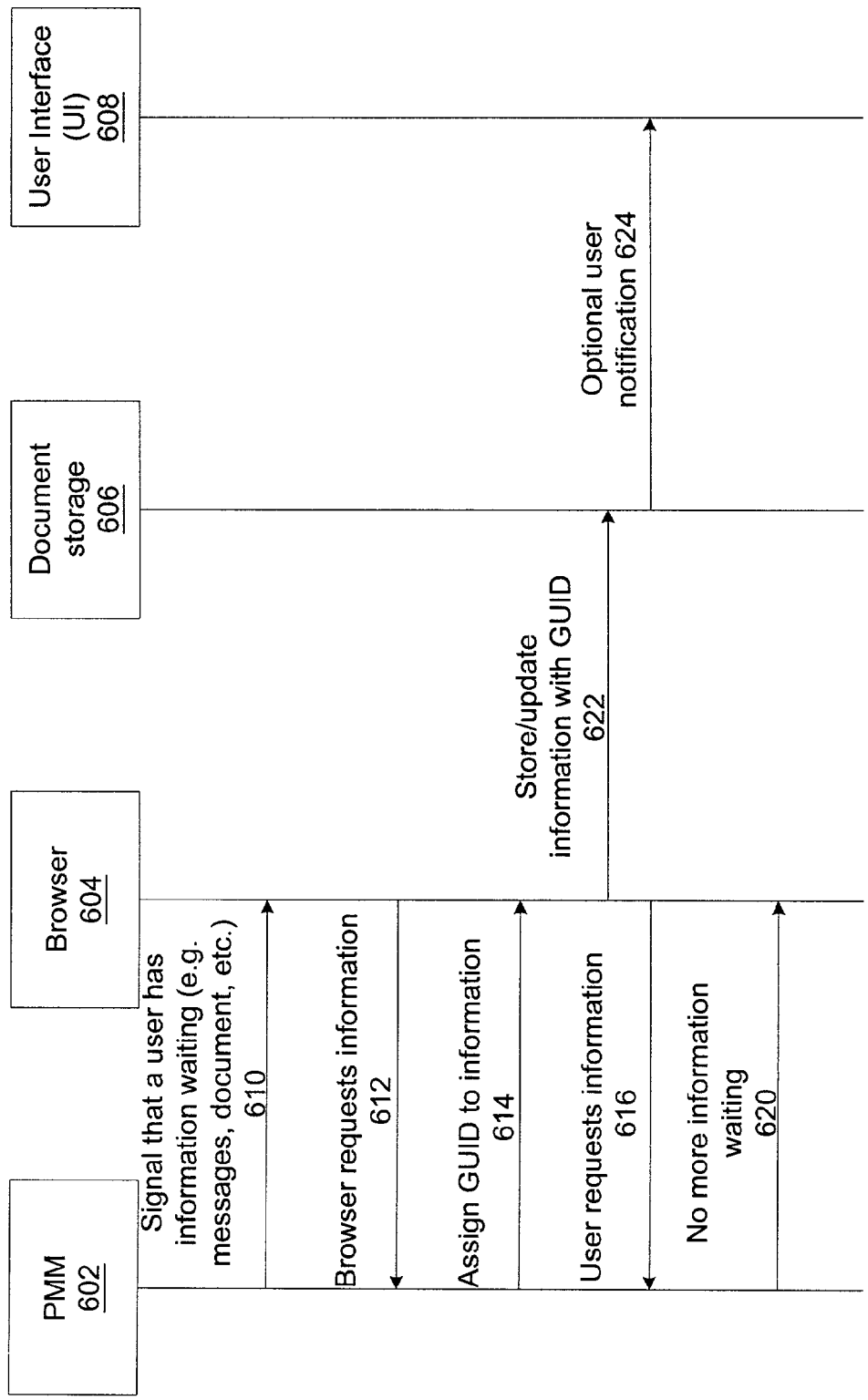
FIG. 6 is a schematic diagram illustrating a process for forwarding updated information to a wireless device, in accordance with an embodiment of the present invention.

FIG. 6 is a schematic diagram illustrating a process for forwarding updated information to wireless device 116 in accordance with an embodiment of the present invention. PMM 602, browser 604, document storage 606 and user interface 608 on wireless device 116 associated with the user, are in communication by way of one another. At step 610, when PMM 602 receives information from the server (e.g., enterprise server 104), PMM 602 passes a signal to browser 604 on wireless device 116 that the user has current messages. At step 612, browser 604 requests the information, as shown in FIG. 6. At step 614, the information is assigned a unique identifier and forwarded. As indicated in FIG. 6, the information may be a document, among other things. The information may include any type of new or modified data suitable for use with the present invention. At step 616, browser 604 sends an acknowledgment that the information was received and requests the next Message and so on until no more information exists, as indicated at step 620. An error message may be sent by wireless device 116 of the user and/or PMM 602 if the message was not received or non-delivery was caused.

It should be noted that this is just one exemplary implementation. Other implementations are possible. For example, PMM 602 can send the messages directly instead of sending a signal and letting the client retrieve the messages.

At step 622, the information may be stored and/or updated with the assigned unique identifier in document storage area 606 on wireless device 116. Optionally, a notification may be forwarded to the user at step 624 via user interface 608 on wireless device 116 and/or a user interface on a fixed computing device. This notification may indicate that the information has been forwarded to wireless device 116. Such notification may alert the user that wireless device 116 of that user has been updated in accordance with new or modified information on the fixed computing device of the user.

As discussed herein, PMM 602 may receive the information and send a push notification to each wireless device 116 that is to receive the information. Transmission of the information can be secured by encrypting it and sending it to wireless device 116 using a technology such as transport layer security (TLS) or wireless transport layer security (WTLS).

If PMM 602 does not receive a request from wireless device 116 for the information (e.g. documents, messages) waiting, PMM 602 may resend the notification. The time intervals for resending a notification may be specified. Other conditions for resending the notification may also be specified. These conditions include resending the notification when wireless device 116 comes back into coverage, when wireless device 116 is turned back on, when a new message arrives at PMM 602, etc.

A new or additional wireless device 116 may also be provisioned utilizing a system and method according to the present system. For example, the user may synchronize a new or additional wireless devices with a fixed computing device of the user. In this scenario, the server may recognize all of the files in the file system as new files and replicate them on wireless device 116 of the user. Accordingly, each file may be assigned a unique identifier and the database may be updated with the information and the unique identifier.

Figure 7:
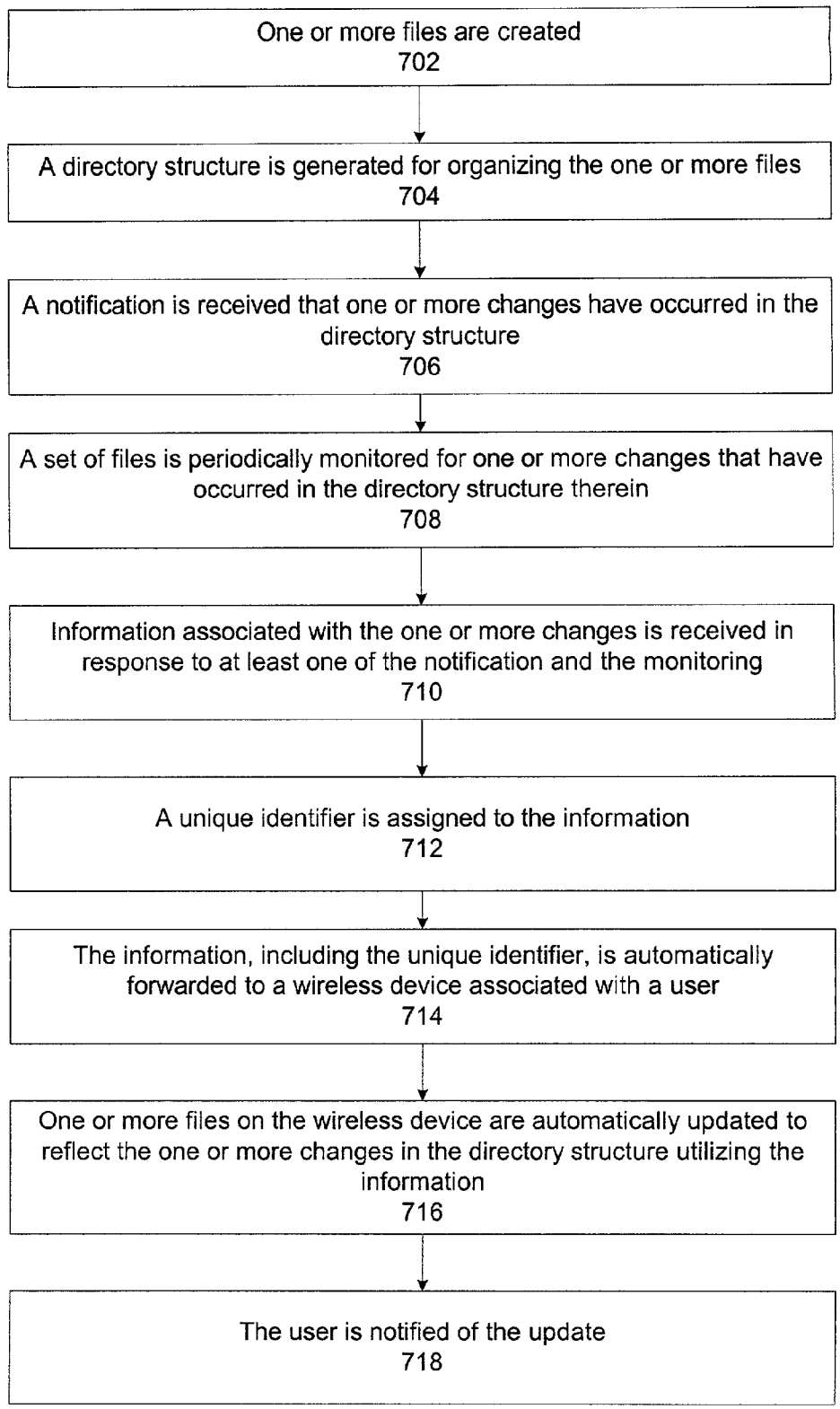
FIG. 7 is a flowchart illustrating a process for updating a wireless device, in accordance with an embodiment of the present invention.

FIG. 7 is a flowchart illustrating a process for updating wireless device 116 in accordance with an embodiment of the present invention. At step 702, one or more files are created. At step 704, a directory structure, such as directory structure 300, is generated for organizing the one or more files. At step 706, a notification is received that a change(s) has occurred in directory structure 300. At step 708, a set of files is periodically monitored for a change(s) that has occurred in directory structure 300 therein. At step 710, information associated with the change(s) is received in response to at least one of the notification and the monitoring. At step 712, a unique identifier is assigned to the information. At step 714, the information, including the unique identifier assigned thereto, is automatically forwarded to a wireless device associated with a user. At step 716, one or more files on wireless device 116 are automatically updated to reflect the change(s) to the directory utilizing the information. At step 718, the user is notified of the update.

As discussed herein, a change(s) may include a modification to an existing file in directory structure 300, the addition of a new file, etc. Where the change(s) includes a change(s) to an existing file in directory structure 300, the information forwarded may include information for replacing the previous file with a new file including the change(s) to the existing file. In other words, the change(s) may be used to overwrite the pre-existing file.

A notification of a change(s)s may be forwarded to the server to alert the server of change(s) to directory structure 300. Furthermore, a notification may be forwarded to a user associated with one or more wireless devices 116 that wireless device 116 has been updated. The notification may be forwarded to the user via wireless device 116 of the user and/or the fixed computing device of the user. Enterprise server 104 may periodically access the file system in order to determine whether change(s) to directory structure 300 have been made. In this scenario, notification may not be forwarded to enterprise server 104 regarding the change(s) in directory structure 300. Rather, notification may be sent to the user of the change(s) or the information may be forwarded to wireless device 116 without notifying the user of the update.

As discussed herein, enterprise server 104 may include various modules for processing the information associated with the change(s). Enterprise server 104 can include a module backplane for connecting to the various modules.

Figure 8:
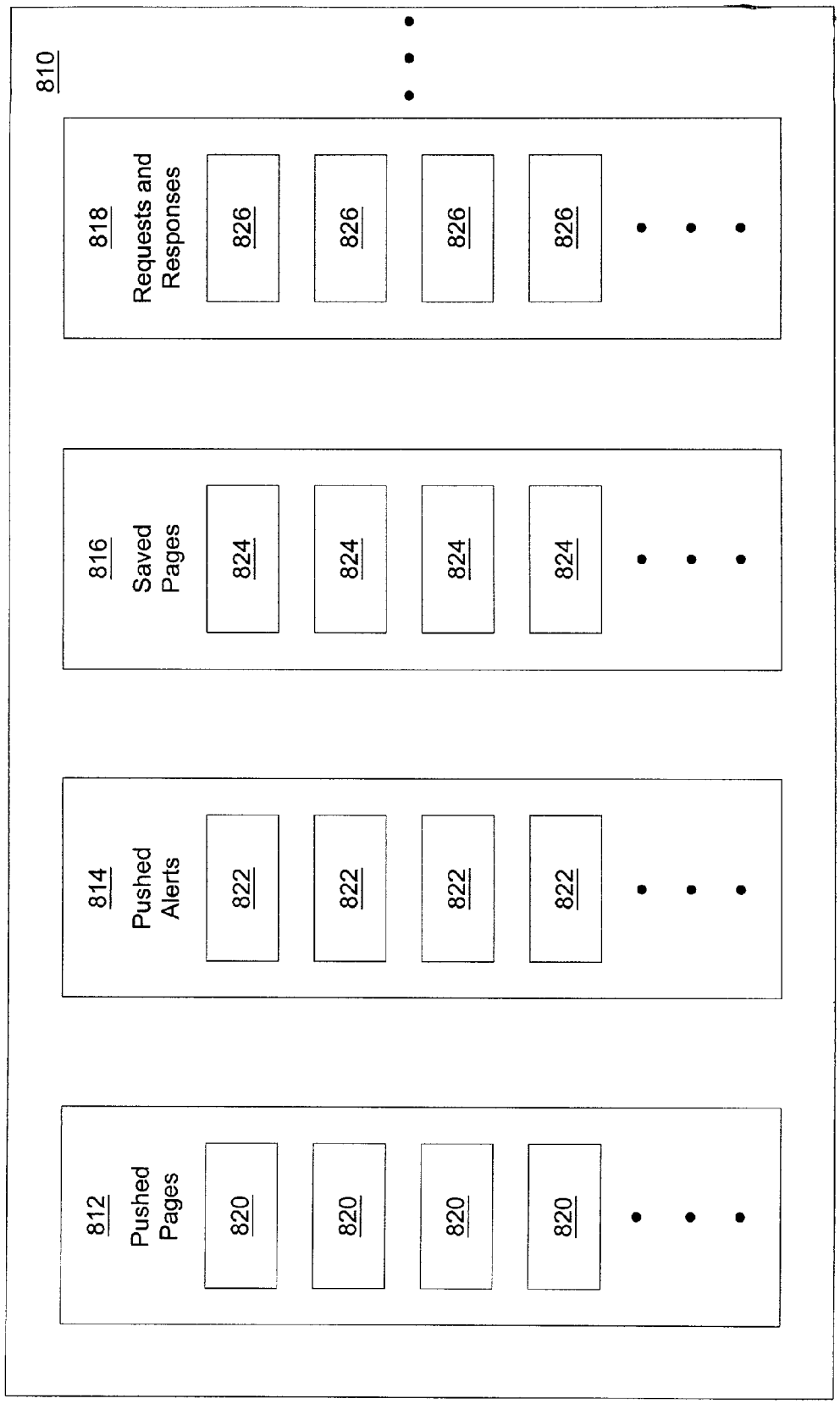
FIG. 8 is a schematic diagram of an information repository, in accordance with an embodiment of the present invention.

Referring to FIG. 8, in one embodiment, information repository 810 resides on wireless device 116. It is contemplated that in alternate embodiments information repository 810 can reside elsewhere, however. Information repository 810 is used to house the set of files discussed herein, including information elements such as documents, alerts, pages, requests, responses and any other suitable information that is pushed to wireless device 116. In one exemplary embodiment, information repository 810 comprises sub-information-repositories 812, 814, 816 and 818. Information repository 810 can comprise additional sub-information-repositories as well.

Pushed pages sub-information-repository 812 comprises pushed pages 820 that have been pushed to wireless device 116 from enterprise server 104. Pushed alerts sub-information-repository 814 comprises pushed alerts 822 that have been pushed to wireless device 116 from enterprise server 104. Saved pages sub-information-repository 816 comprises saved pages 824 that have been saved to wireless device 116, either automatically by a script or by a user. Requests and responses sub-information-repository 818 comprises requests 826 and corresponding responses 828 that have been pushed/saved to wireless device 116. In one embodiment, the various information elements, including pushed pages 820, pushed alerts 822, saved pages 824, requests 826, responses 828, etc., comprise a mark-up language and a state (defined by variables). In one embodiment, each information element has a unique identifier associated therewith. This association can be useful for updating the information elements.

Pushed pages 820 are items that an application or a person wants to store directly on wireless device 116 via a push. Saved pages 824 are primarily user-initiated saves (although the saves can be initiated by an application). Since saved pages 824 are usually user-initiated they are usually the result of a particular request. For example, a user might save an information page that he or she looked up in a company directory, or the confirmation number from a stock order, etc.

As another example, pushed page 820 is pushed to wireless device 116 by an application. Pushed page 820 comprises a price list dated Apr. 2, 2002. Pushed page 820 has a unique identifier, 0050, associated therewith. On Apr. 9, 2002, the price list has been updated. A new pushed page 820, comprising the updated price list, is pushed to wireless device 116 with the same unique identifier of 0050. Consequently, new pushed page 820 comprising the April 9 price list overwrites pushed page 820 comprising the April 2 price list. This concept is discussed herein and referred to herein as "unique identifier overwrite."

Pushed alerts 822 are similar to pushed pages 820, except for the fact that pushed alerts 822 are intended to be used for more transient objects and for the fact that a dialog box is displayed to a user, which shows the alert. In the case of pushed alerts 822, in one embodiment, the user sees a dialog box with alert 822 that has been pushed to pushed alerts sub-information-repository 814. A title of the alert is displayed along with a time of the alert. Actions can be taken, in some instances. For example, the alert is from a financial institution and states that the price of Acme Corporation stock dropped 20 points. The user is prompted as to whether he or she wishes to purchase shares of Acme Corporation.

Saved pages 824 are implemented when a user is interacting with an application and he or she wants to save what is on a screen of wireless device 116. Some examples of saved pages include stock quotes, information pages, news reports, etc. Another use of saved pages 824 is when a user is filling out a form. For example, a user causes an order entry form to be pushed to wireless device 116 and stored in pushed pages sub-information-repository 812 (in information repository 810) as pushed page 820. Subsequently, the user brings up the form on wireless device 116 because he or she wants to enter an order. While the user is filling out the form, the user discovers that he or she does not have all of the information that the form requires. The user then saves, in saved pages sub-information-repository 816, the page containing the form with the current state of the form. The partially filled-out form is saved as saved page 824. The user can later retrieve the page containing the partially filled-out form, and then finish filling out the form.

Requests and responses sub-information-repository 818 is useful when, for example, a user wants to submit a form to enterprise server 104. A user causes the form to be pushed into requests and responses sub-information-repository 818 and stored as request 826. Request 826 is automatically transmitted to enterprise server 104 when wireless device 116 is in coverage, i.e., there is enough bandwidth to complete the transaction without error.

Once request 826 is submitted, the user can see which request 826 was submitted to enterprise server 104, when request 826 was sent, etc. The results of request 826 are eventually received by wireless device 116 and pushed into requests and responses sub-information-repository 818 as response 828. The user can then view the results as response 828.

Figure 9:
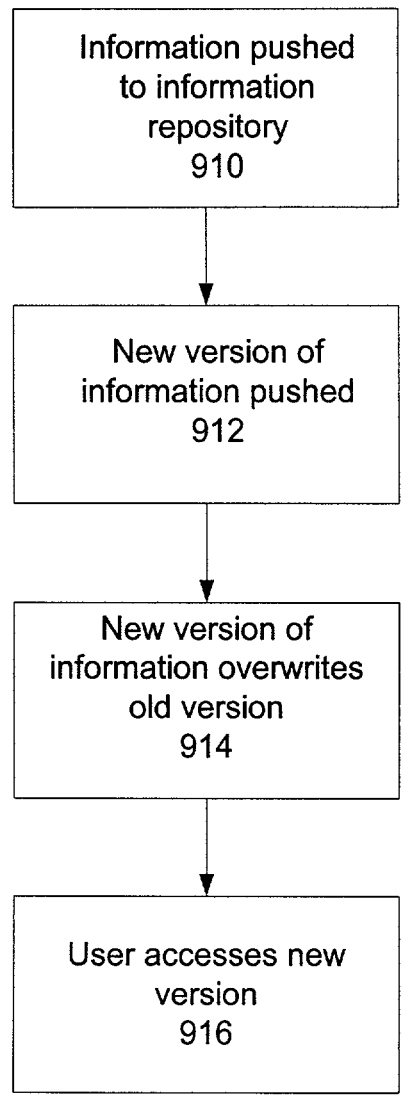
FIG. 9 is a flowchart illustrating unique identifier overwrite, in accordance with an embodiment of the present invention.

Referring to FIG. 9, one specific example of unique identifier overwrite, referred to herein, is examined. At step 910, information is pushed from PMM 106 of enterprise server 104 to an appropriate sub-information-repository of information repository 810 on wireless device 116. In this example, the information is a price list, sent by an Information Technology (IT) Manager. However, the information can be sent automatically or by any suitable person or application.

The price list has a unique identifier of 0078 associated therewith. At some later time, at step 912, the IT Manager has a new price list that he or she causes PMM 106 to push to the appropriate sub-information-repository of information repository 810 on wireless device 116 with the same unique identifier. At step 914, the new price list overwrites the previous price list stored in information repository 810. At step 916, a user of wireless device 116 accesses the new price list.

Figure 10:
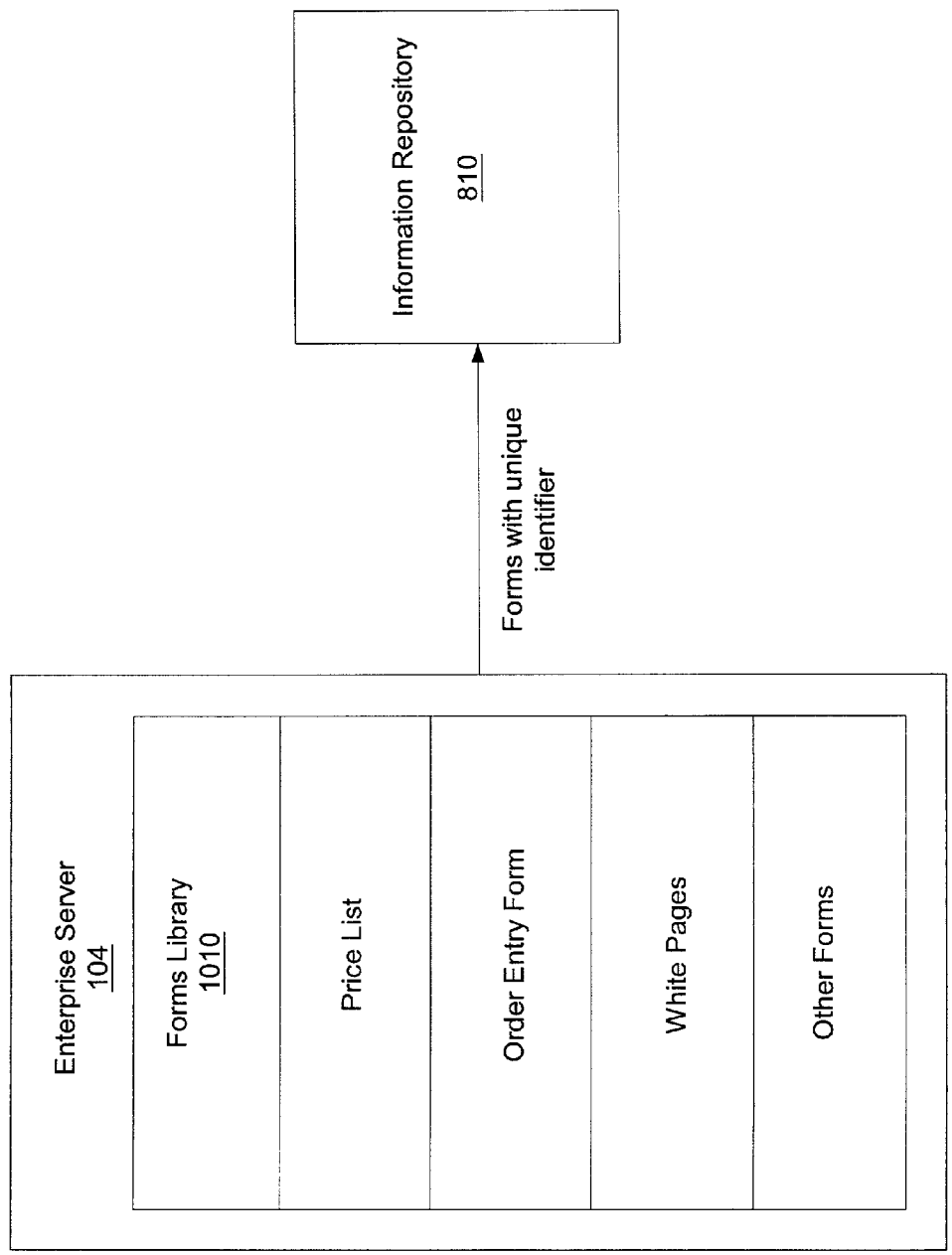
FIG. 10 is a schematic diagram illustrating one exemplary use for the information repository, in accordance with an embodiment of the present invention.

Referring to FIG. 10, one exemplary use of information repository 810 is illustrated. Forms library 1010 resides on enterprise server 104 and wireless device 116. Forms library 1010 includes forms (documents) such as price lists, order entry forms, white pages and various other forms. Each of the forms in forms library 1010 has a unique identifier associated therewith. When one of the forms in forms library 1010 is modified, the modified version is sent to wireless device 116 with the same unique identifier as the form had before. Thus, the modified version of the form overwrites the previous version of the form at information repository 810. Therefore, a user of wireless device 116 always has all of the latest forms he or she might need ready in information repository 810 for use. This update process is accomplished with the use of the unique identifiers. In one embodiment, an IT manager enables the user to receive updates to a set of standard forms. In another embodiment, the IT manager enables the user to receive updates to a set of standard forms, and the user requests any additional form(s) for which he or she wants automatic updates for.

In yet another embodiment according to the present invention, an application (e.g., Siebel, another suitable application such as a thin client application with scripting, etc.) running on wireless device 116 saves a page on wireless device 116 using a unique identifier. Script extensions, such as WML script extensions, Java script extensions, etc., allow an application to programmatically save a page on wireless device 116.

For example, a user of wireless device 116 may have a list, every day, of actionable items to which he or she is supposed to attend. It may be very important for the user to receive the daily list of actionable items from enterprise server 104, even if wireless device 116 is not in coverage. The application, at the beginning of each day when the user logs on to wireless device 116, displays the list of actionable items and saves the list to information repository 810. It is desired that only one item in information repository 810 is a daily list of actionable items. Therefore, the application programmatically saves the list to information repository 810 with a unique identifier using a script extension. More precisely, the application pushes the list to pushed pages sub-information-repository 812. The user can then interact with and/or modify the page containing the list. Whenever the application saves a new updated list to information repository 810, the same unique identifier is used. Consequently, the new updated list overwrites the previous list so that there is only one copy of the list in information repository 810, as desired. The user can recall the list at any time by prompting the application to load the list from information repository 810, using the same unique identifier. As can be seen, the application can load, save and overwrite information (pages, etc.) using unique identifiers. Information repository 810 thus functions similarly to a local cache or database that the application/user can access without accessing enterprise server 104 (for example, when wireless device 116 is not in coverage, etc.).

Figure 11:
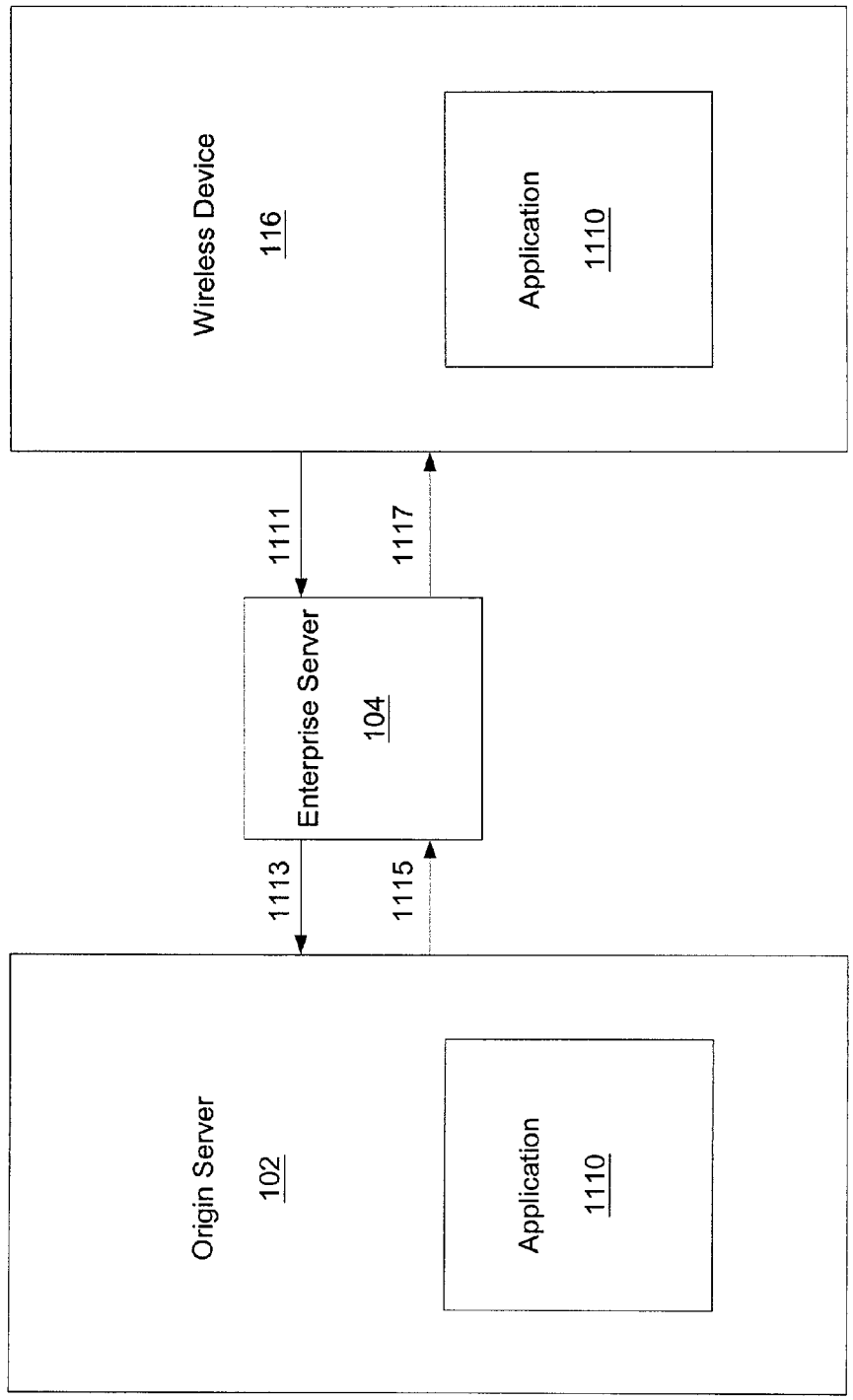
FIG. 11 is a schematic diagram illustrating one exemplary process flow, in accordance with an embodiment of the present invention.

In one exemplary process flow, shown schematically in FIG. 11, at step 1111, application 1110 on wireless device 116 makes a request for information, such as a daily list of actionable items, to enterprise server 104. Application 1110 can be a thin client application with scripting, or any other suitable type of application.

At step 1113, enterprise server 104 handles the request and gives this request to origin server 102 (which also runs application 1110). Origin server 102 uses application 1110 logic to facilitate processing of the request. Origin server 102 is a web server or application server that hosts the application, e.g., a server running Siebel, BEA WebLogic, Microsoft IIS, etc.

Application 1110, on origin server 102, generates results (a page). At step 1115, origin server 102 returns the results to enterprise server 104. At step 1117, enterprise server 104 send the results to wireless device 116 for display to the user. More precisely, application 1110 on origin server 102 is sending a page(s) of markup language to wireless device 116. Within that markup language is scripting code. Application 1110 on origin server 102 is sending back a program(s) that runs on wireless device 116. The scripting code is generated at origin server 102. Application 1110 on origin server 102 sends a page that has a program(s) (scripting language) contained within the page. The program(s) is executed on wireless device 116.

In the near future, it is expected that there will be two fundamentally different types of wireless networks. There are going to be high bandwidth networks that are limited in their coverage. An example is an 802.11 network in a corporate building, airport, coffee shop, etc., or a wired Ethernet connection, etc. Moreover, there will be slower networks that are going to have vast coverage such as GPRS and Mobitex.

These two (or more) types of networks have very different parameters for how they work (e.g., high bandwidth/low availability, low bandwidth/high availability, etc.). The ways in which a wireless application would be written are very different depending on what type of network one is targeting.

If one is targeting a high bandwidth network then application 1110 might send a lot of large files, for example. It would be desirable to have a device that switches between networks. Therefore, when wireless device 116 is inside a building it switches to a fast network, for example. When wireless device 116 is outside it switches to slower network, for example. Embodiments according to the present invention include the application recognizing the type of network (e.g., the level of bandwidth of the network) wireless device 116 is in, then change the behavior of application 1110 accordingly.

In one embodiment a system and method according to the present invention includes a request queue for a wireless device. A queue on a wireless device receives a user request. The request may include a request for information over a network, a request to interact with a web application, a request to connect to a particular website, etc. The queue monitors a coverage status for the wireless device. The request is sent over a network when the monitoring reveals that the device is in an area of coverage, or when the bandwidth in the area of coverage meets a certain test. The queue stores a response to the request and updates the status of the request to indicate a response has been received.

Thus, instead of sending a message, request, etc., directly over a network, the user of a wireless device sends the request to a queue on the wireless device. The queue then forwards the request over the network when the wireless device is in an area of coverage. Both the request and the response are stored in the queue. The request in the queue can be updated with icons indicating that the request is waiting to be sent, has been sent, has been completed and/or responded to, or has an error associated therewith.

Some of the key features of the present invention include: allowing a user to interact with a network regardless of the current coverage, by sending requests, messages, etc., to a queue on a wireless device of the user; displaying icons via the user interface on the wireless device that indicate the status of the request; and allowing a user to select a request in order to display the request and/or the response associated therewith.

In one embodiment, when a user makes a request, instead of going through a network directly, the request goes to a queue. As the user (and/or wireless device 116) enters a network coverage area, the request will be sent. Alternatively, if wireless device 116 is out of a network coverage area, the system will just wait and whenever wireless device 116 is in the network coverage area, the information will be sent. Then in that same queue (or different queues, in an alternate embodiment) there is now an entry of both the original request and the response. This method allows you interact with the network regardless of what the network coverage is currently. Also, one can perform multiple major operations all at once. It is noteworthy that in prior art systems, manual synchronization, batch modes, or special server support is required to obtain the results.

In one embodiment, there is a submit "button" on wireless device 116. The user can push this button to submit a request. When the user submits the request (e.g., form, etc.), the request is submitted not to the network but to a queue in the wireless device.

The user can submit multiple requests. Each request can have a status icon associated therewith. The status icons indicate that the request is waiting to be sent, has been sent, that there was an error or that the response is waiting. These aforementioned status icons are merely exemplary, and other icons may be used.

After the user submits a request, the user can review the response. One example of such a response is a stock purchase confirmation. Alternatively, the user can review an error code indicating the request could not be processed, there was not enough money in the account, etc.

In one embodiment, there is no coverage at first, so the user makes a request for a stock purchase. The request is added to the queue automatically when wireless device 116 is out of coverage or when the application instructs (in an alternate embodiment the user must actively instruct that the request and/or response is to go to the queue). The device then comes within a coverage area and notices it is in coverage. The request is then sent, a response is received (e.g., the stock was purchased, etc.), and the status icon is updated. The response is then stored in a queue.

In another embodiment, generally, there is provided a system for a request queue on a device, such as wireless device 116. The system comprises a user interface for guaranteeing from a thin client a request and response for a transaction from wireless device 116 using standard protocols without requiring any special support on a server. The method further comprises a mechanism for submitting requests, and a queue on the client of pending requests that get processed automatically whenever connectivity is possible, including the ability for a user to submit a request, view the request and a corresponding response, to save, to store and to delete the request and response, along with notification of the state of each request and response.

In an exemplary embodiment, the present system includes a mixed wireless/wired system that modifies application behavior based on bandwidth. Enterprise server 104 notifies an application on enterprise server 104 or client side device, such as client wireless device 116, of current bandwidth parameters. Such a system allows application 1110 on the client (e.g., wireless device 116), or application 1110 on enterprise server 104 in communication with the client, to change its behavior based on the bandwidth available for transmission to/from client wireless device 116. For example, application 1110 may modify its behavior such that time-sensitive orders may be sent over low bandwidth, while non-time-sensitive orders may be sent when wireless device 116 is in a high bandwidth state, or vice versa. In an alternate embodiment, application 1110 may modify its behavior such that synchronization of information (i.e., updating information) between wireless device 116 and enterprise server 104 occurs when wireless device 116 is in a high bandwidth state and not when wireless device 116 is in a low bandwidth state, or vice versa.

One example of when application 1110 may modify its behavior based on available bandwidth is application 1110 deciding when to forward information from client wireless device 116 to enterprise server 104. Another example of when application 1110 may modify its behavior based on available bandwidth is application 1110 deciding when to forward a request for information from wireless device 116 to enterprise server 104. Wireless device 116 then receives a response of some type.

In another embodiment, application 1110 logic may be changed via scripting and server side libraries based on bandwidth. Once again, application 1110 on the client (e.g., wireless device 116) is notified of changes in bandwidth parameters. Application 1110 can modify its behavior based on the current bandwidth parameters. Application 1110 may modify its behavior in order to send or retrieve information at a rate that is appropriate for the particular information being sent or retrieved. The example of time-sensitive orders, herein, is illustrative.

As an example of client side logic changes, an object on the client (e.g., wireless device 116) needs to be forwarded to enterprise server 104. If wireless device 116 is not in coverage, the object may be stored and forwarded at a later time when wireless device 116 is in coverage. Alternatively, if wireless device 116 is in coverage, the type of coverage and rules relating to that coverage may be examined.

For instance, application 1110 may be instructed to send the object only when wireless device 116 is in a medium or high bandwidth state, but not in a low bandwidth state, and only from a home office, or only on Tuesdays, etc. The rules indicate to application 1110 under what conditions and coverage to forward the object. It may be that application 1110 is instructed to forward the object whenever the client is in any bandwidth state, for instance. Alternatively, it may be that application 1110 is instructed to forward the object only when the client is in a bandwidth state greater than a threshold amount. The system can generate rules for instructing application 1110 on how to behave or how to modify its behavior in response to a specified set of circumstances.

Utilizing the present system, application(s) 1110 can modify their behavior, or have their behavior modified, depending on bandwidth parameters, as well as modify additional rules relating to a specific application. Some of the means of notifying the application of changes in bandwidth parameters include script libraries run on the client (e.g., wireless device 116) and server libraries that include call direct query and call-back mechanisms. As another example, an application might be defaulted to display the result of, for example, five previous requests for information in a high bandwidth situation, but only the results of, say, one request for information in a low bandwidth situation. Conversely, application 1110 might be defaulted to display the result of, for example, five previous requests for information in a low bandwidth situation, but only the results of, for example, one request for information in a high bandwidth situation.

Application 1110 can receive information regarding the available bandwidth for the current location of wireless device 116 from enterprise server 104, wireless device 116, or by any other suitable means. Application 1110 logic on wireless device 116 and/or enterprise server 104 can be changed based on bandwidth via scripting and server side libraries, or by any other suitable means.

Further, application 1110 can be optimized to work in coverage areas of various levels of bandwidth. Browser 118 and enterprise server 104 communicate to keep track of the coverage of each wireless device 116. Application 1110, which can be running on wireless device 116 and/or enterprise server 104, monitors the current level of bandwidth and changes therein. Application 1110 changes its behavior, based on the current level of bandwidth (i.e., the bandwidth parameters of wireless device 116), in order to handle information differently.

An instance where a user may want to handle information differently in a high bandwidth versus low bandwidth situation is communicating information from wireless device 116 to enterprise server 104. In one embodiment, as mentioned herein, a user can send information to enterprise server 104 from wireless device 116. The information to be sent can be queued up and sent when wireless device 116 is in coverage. If the user is sending a large number of different requests back to enterprise server 104 that are not time-critical then application 1110, in one embodiment, waits until wireless device 116 is in high bandwidth coverage before sending requests to enterprise server 104.

Initially, the application queues up the requests. Then, if wireless device 116 is in bandwidth coverage that falls within a certain range (e.g., high bandwidth coverage), application 1110 waits until the bandwidth passes a certain threshold level. In an alternative embodiment, one or more requests are flagged as high priority, and are sent to enterprise server 104 regardless of the current bandwidth available to wireless device 116.

In a further embodiment, different bandwidth states are defined, which are known to application 1110. Each bandwidth state represents a level of bandwidth that is available for the network with which wireless device 116 is currently coupled to enterprise server 104. There may be many different networks that wireless device 116 can use to couple to enterprise server 104. For example, there may be a wireless local area network (LAN) with high bandwidth capability. Other types of networks may exhibit more or less bandwidth capability. In one embodiment, application 1110 handles each type of network differently. In an alternative embodiment, application 1110 may group networks together. For example, application 1110 may group wireless LAN networks and cable networks into a single group assuming that both types of networks are high bandwidth/limited availability. This group can be defined to represent a high bandwidth state, for example. Application 1110 also defines other networks as exhibiting a low bandwidth state, or other bandwidth states. Therefore, there may be three bandwidth states (i.e., high, low, other) defined in one exemplary system. The current bandwidth state of wireless device 116 depends upon which network wireless device 116 is utilizing. Another example of a network with local coverage that is relatively inexpensive is wireless wide area network (WAN). An example of an expensive network is wireless WAN with roaming coverage.

In yet another scenario, a user may want a large amount of data available to the user when traveling. The user may desire information be available to the user even when wireless device 116 is not in coverage. For example, the user may have a file comprising a price list with long descriptions representing a large number of products. This file may be a half a megabyte of information, for example. The user may not want to send that file over a wireless WAN because doing so may be expensive and time consuming. Thus, the application 1110 can modify its behavior, and refrain from sending the information while in this network state. However, when application 1110 determines that the network is a high bandwidth state at a low transmission cost, application 1110 then transmits the file.

As mentioned herein, application 1110 may be located in whole (or in part) on enterprise server 104. In these cases, wireless device 116 communicates the type of network the client is utilizing to enterprise server 104. As wireless device 116 utilizes different networks, browser 118 and/or application 1110 sends a notification to enterprise server 104. Application 1110 modifies its behavior by changing the amount of files sent from enterprise server 104 to wireless device 116 based on the bandwidth available to wireless device 116. For example, if wireless device 116 is coupled to a low bandwidth network, then the application sends three files. However, if wireless device 116 is coupled to a high bandwidth network, then application 1110 sends a larger number of files.

Application 1110 determines what type of network and/or bandwidth is currently available to wireless device 116. One way this determination is made is that wireless device 116 communicates directly with enterprise server 104. Each time wireless device 116 changes network connections, wireless device 116 sends a message to enterprise server 104, and enterprise server 104 stores that information.

Another way this determination is made is that enterprise server 104 determines the network bandwidth indirectly by the method wireless device 116 uses to connect to enterprise server 104. For example, if wireless device 116 connects to enterprise server 104 using GPRS then the bandwidth is limited. If wireless device 116 later connects to enterprise server 104 using the IEEE 802.11 standard and a wired line then wireless device 116 is in high bandwidth. In each case, enterprise server 104 stores the state so that application 1110 can query enterprise server 104 as to the bandwidth that a particular wireless device 116 is in and/or was in last.

Application 1110 then alters its behavior depending on the current bandwidth or network state. As mentioned herein, there may be many possible network states. In another embodiment, script extensions are included in web pages in order to allow for different behavior depending upon current available bandwidth.

As another example, depending upon current available bandwidth, the application can request the graph of a stock's history or just the pertinent numbers. In yet another example, a user may request 12 articles from enterprise server 104 using wireless device 116. Initially, the user enters these requests, which will be queued up regardless of the level of bandwidth coverage. Subsequently, application 1110 modifies its behavior, and only sends the requested article(s) to wireless device 116 when the bandwidth meets a certain criterion (or criteria). However, it is noteworthy that one or more articles may be flagged as high priority, in which case application 1110 will modify its behavior and send these high priority articles even when the bandwidth criterion is not met.

Figure 12:
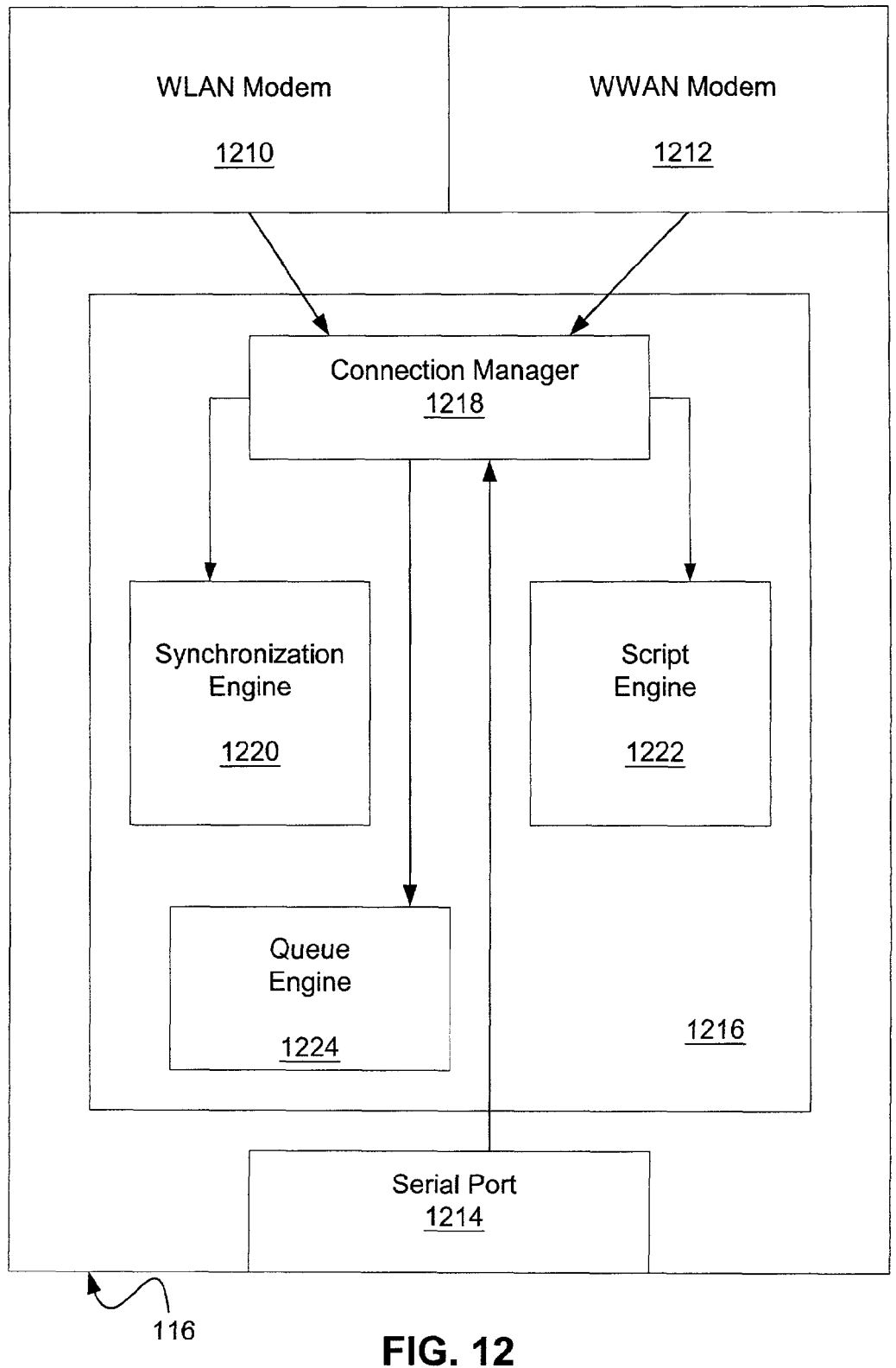
FIG. 12 is a block diagram of an application, in accordance with an embodiment of the present invention.

Referring to FIG. 12, in one embodiment, wireless device 116 is a personal digital assistant (PDA). However, wireless device 116 can include any suitable device, and need not be wireless. Wireless device 116 comprises wireless LAN modem 1210 and wireless WAN modem 1212. Wireless device 116 also comprises serial port 1214, as well as any other suitable port.

Module 1216, which is part of application 1110 and can reside in any suitable location, comprises connection manager 1218, synchronization engine 1220, script engine 1222 and queue engine 1224. Connection manager 1218 monitors the ports of wireless device 116 to determine which port is currently active, including serial port 1214, wireless LAN modem 1210 port and wireless WAN modem 1212 port. Script engine 1220 requests active connection data from connection manager 1218 so that script engine 1220 can determine the bandwidth via the connection type. Script engine 1220 will then be able to inform application 1110 about the current bandwidth. The subsequently relayed active connection data is used by script engine 1220 to communicate to application 1110 the bandwidth state so that application 1110 can adapt its behavior.

Typically, connection manager 1218 communicates with enterprise server 104. Such communications to enterprise server 104 include current active port or ports data. Consequently, enterprise server 104 knows when the network state changes. For example, enterprise server 104 knows when the network wireless device 116 is communicating with changes from LAN to WAN. The behavior of application 1110 is then modified accordingly. It is contemplated that the behavior of application 1110 can be modified by application 1110 itself, by enterprise server 104 or by any other suitable mechanism.

If a synchronization of wireless device 116 is to be performed, synchronization engine 1220 requests connection data from connection manager 1218 regarding what kind of connection is being used. Thus, synchronization engine 1220 knows what rules to follow to perform a synchronization. Likewise, if a request is to be put into a queue, queue engine 1224 requests connection data from connection manager 1218 so that queue engine 1224 knows what rules to follow when submitting requests to enterprise server 104.

Figure 13:
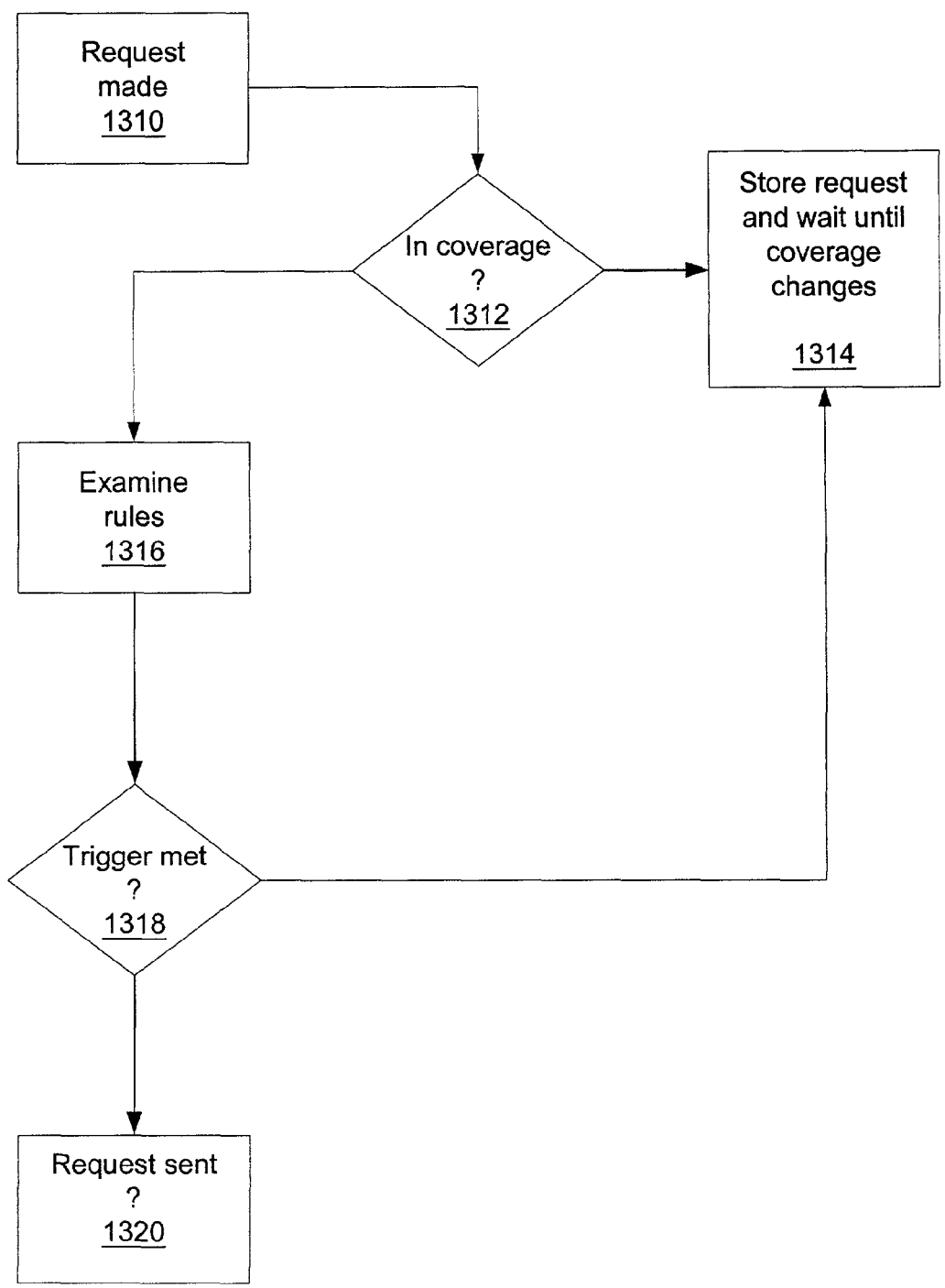
FIG. 13 is a flowchart of a method, in accordance with an embodiment of the present invention.

Referring to FIG. 13, one exemplary method for modifying application behavior according to bandwidth is illustrated. At step 1310, a request for information is made on wireless device 116 using HTTP or another suitable protocol. Subsequently, at step 1312, a check is made to determine if wireless device 116 is in coverage.

One way that the check can be made is that the manufacturer of wireless device 116 (or another entity) provides application programming interfaces (APIs) that can be queried to return the connection status. These APIs check the hardware of wireless device 116. Sometimes whether wireless device 116 "in coverage" is not a well-defined state. Therefore, some transactions may or may not be successful under these circumstances. Thus, the system determines if wireless device 116 is in coverage by attempting a transaction.

At step 1314, if wireless device 116 is not in coverage then the request is stored in a request queue until coverage changes. If coverage changes, then the method proceeds to step 1410 of FIG. 14.

After the check is made at step 1312, if wireless device 116 is in coverage then rules are examined at step 1316. At step 1318, the system determines whether the coverage meets a trigger according to the rules. For example, the system determines whether the bandwidth falls within a certain range. If the coverage does not meet a trigger then the process proceeds to step 1314. If the coverage does meet a trigger at step 1316, then the request for information is sent to enterprise server 104 at step 1320, and the process proceeds to step 1412 of FIG. 14.

Figure 14:
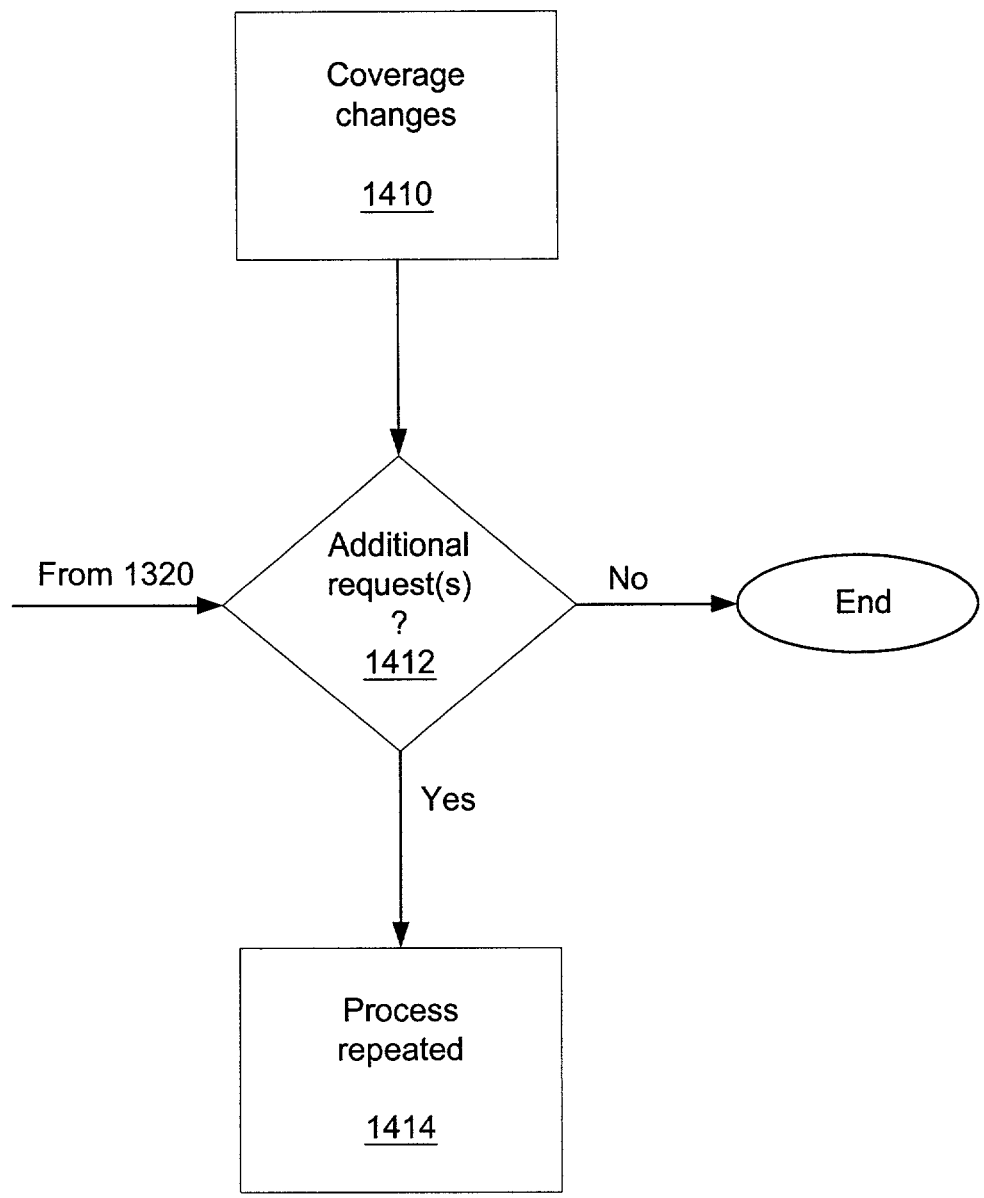
FIG. 14 is a flowchart of a method when coverage changes, in accordance with an embodiment of the present invention.

At step 1314, when coverage changes the process proceeds to step 1410 of FIG. 14, as mentioned herein. At step 1412, a check is made as to whether there were additional request(s) for information made. If there are no additional request(s), then the task is complete. However, at step 1414, if there is an additional request(s) then the process is repeated for other request(s).

In summary, in one embodiment, the client (e.g., wireless device 116, etc.) monitors the type of connection, communicates the type of connection to enterprise server 104, and sets the correct behavior for client subsystems (e.g., queuing subsystems, synchronization subsystems, etc.) depending on the connection type. The connection type is communicated to application 1110 so application 1110 can present the correct behavior (e.g., queuing behavior, synchronization behavior, etc.). The system further notifies any applications that have requested to be notified of a change in network state.

Figure 15:
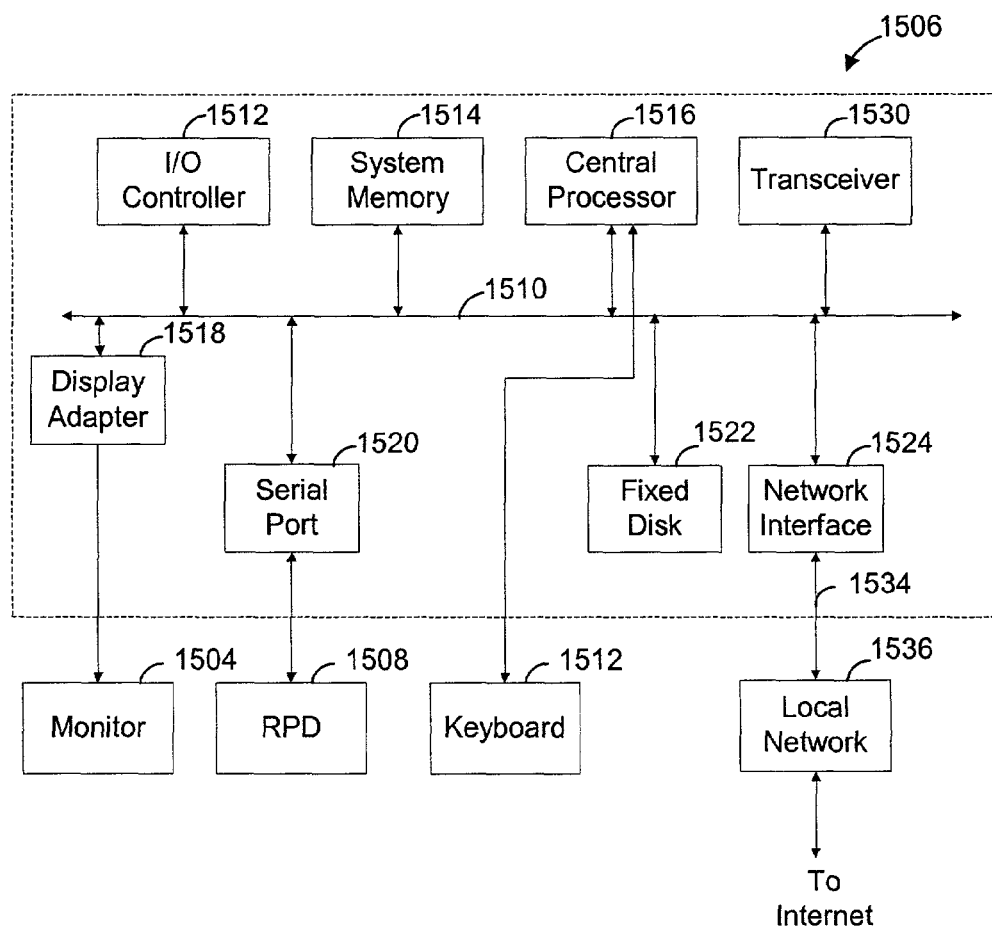
FIG. 15 illustrates subsystems of an exemplary computer system for use with the present invention.

FIG. 15 illustrates subsystems found in one exemplary computer system, such as computer system 1506, that can be used in accordance with embodiments of the present invention. Computers can be configured with many different hardware components and can be made in many dimensions and styles (e.g., laptop, palmtop, server, workstation and mainframe). Thus, any hardware platform suitable for performing the processing described herein is suitable for use with the present invention.

Subsystems within computer system 1506 are directly interfaced to an internal bus 1510. The subsystems include an input/output (I/O) controller 1512, a system random access memory (RAM) 1514, a central processing unit (CPU) 1516, a display adapter 1518, a serial port 1520, a fixed disk 1522 and a network interface adapter 1524. The use of bus 1510 allows each of the subsystems to transfer data among the subsystems and, most importantly, with CPU 1516. External devices can communicate with CPU 1516 or other subsystems via bus 1510 by interfacing with a subsystem on bus 1510.

One embodiment according to the present invention is related to the use of an apparatus, such as computer system 1506, for implementing a system according to embodiments of the present invention. CPU 1516 can execute one or more sequences of one or more instructions contained in system memory 1514. Such instructions may be read into system memory 1514 from a computer-readable medium, such as fixed disk 1522. Execution of the sequences of instructions contained in system memory 1514 causes the CPU 1516 to perform process steps, such as the process steps described herein. One or more processors in a multi-processing arrangement may also be employed to execute the sequences of instructions contained in system memory 1514. In alternative embodiments, hard-wired circuitry may be used in place of or in combination with software instructions to implement the invention. Thus, embodiments of the invention are not limited to any specific combination of hardware circuitry and software.

The terms "computer-readable medium" and "computer-readable media" as used herein refer to any medium or media that participate in providing instructions to CPU 1516 for execution. Such media can take many forms, including, but not limited to, non-volatile media, volatile media and transmission media. Non-volatile media include, for example, optical or magnetic disks, such as fixed disk 1522. Volatile media include dynamic memory, such as system memory 1514. Transmission media include coaxial cables, copper wire and fiber optics, among others, including the wires that comprise one embodiment of bus 1510. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, punch cards, paper tape, any other physical medium with patterns of marks or holes, a RAM, a PROM, an EPROM, a FLASHEPROM, any other memory chip or cartridge, a carrier wave, or any other medium from which a computer can read.

Various forms of computer-readable media may be involved in carrying one or more sequences of one or more instructions to CPU 1516 for execution. Bus 1510 carries the data to system memory 1514, from which CPU 1516 retrieves and executes the instructions. The instructions received by system memory 1514 can optionally be stored on fixed disk 1522 either before or after execution by CPU 1516.

FIG. 15 is merely illustrative of one suitable configuration for providing a system in accordance with the present invention. Subsystems, components or devices other than those shown in FIG. 15 can be added without deviating from the scope of the invention. A suitable computer system can also be achieved without using all of the subsystems shown in FIG. 15. Other subsystems such as a CD-ROM drive, graphics accelerator, etc., can be included in the configuration without affecting the performance of computer system 1506.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A wireless device having a central processing unit (CPU) and a plurality of modems, each said modem being for use in establishing a different type of wireless connection, in which the CPU is coupled to:
   a connection manager configured to:
      monitor use of the plurality of modems in order to determine whether the wireless device has a wireless connection with a wireless local area network (WLAN) or a mobile communication network, a wireless connection with the WLAN having a first bandwidth state associated therewith and a wireless connection with the mobile communication network having a second, different, bandwidth state associated therewith; and
      in response to a change in the use of the plurality of modems, notify an application executing on the wireless device of the change;
   wherein the application is configured to:
      establish a communication operation with a server remote from the wireless device based on capabilities associated with whichever of the first or second bandwidth state has been determined for the wireless connection and at least one rule for use in controlling communication between the application and the server; and
      in response to said notification, modify the communication operation on the basis of said change.

2. The system of claim 1, wherein the connection manager is configured to communicate data indicative of the determined first or second bandwidth state associated with the wireless connection to the application.

3. The system of claim 2, wherein the application is configured to modify the communication operation based on the determined first or second bandwidth state associated with the wireless connection.

4. The system of claim 3, wherein said modification comprises enabling synchronization of information between the wireless device and the server when the wireless connection is determined to be in the first bandwidth state.

5. The system of claim 3, wherein said modification comprises disabling synchronization of information between the wireless device and the server when the wireless connection is determined to be in the second bandwidth state.

6. A method for controlling communication between an application executing on a wireless device and a server remote from the wireless device, the wireless device comprising a plurality of modems for use in establishing a different type of wireless connection, the method comprising:
   maintaining at least one rule for use in controlling communication between the application and the server;
   monitoring use of the plurality of modems in order to determine whether the wireless device has a wireless connection with a wireless local area network (WLAN) or a mobile communication network, a wireless connection with the WLAN having a first bandwidth state associated therewith and a wireless connection with the mobile communication network having a second, different, bandwidth state associated therewith;
   establishing a communication operation of the application executing on the wireless device based on capabilities associated with whichever of the first or second bandwidth state has been determined for the wireless connection and said at least one rule;
   in response to a change in the use of the plurality of modems, notifying the application of the change; and in response to said notification, causing the application to modify the communication operation on the basis of said change.

7. The method of claim 6 further comprising communicating data indicative of the determined first or second bandwidth state associated with the wireless connection to the application.

8. The method of claim 7 further comprising modifying the communication operation based on the determined first or second bandwidth state associated with the wireless connection.

9. The method of claim 8, wherein said modification comprises enabling synchronization of information between the wireless device and the server when the wireless connection is determined to be in the first bandwidth state.

10. The method of claim 8, wherein said modification comprises disabling synchronization of information between the wireless device and the server when the wireless connection is determined to be in the second bandwidth state.

11. A non-transitory machine-readable storage medium having stored thereon data representing sets of instructions which, when executed by a machine, cause the machine to:
   monitor use of a plurality of modems associated with a wireless device, each said modem being for use in establishing a different type of wireless connection on the wireless device;
   determine whether the wireless device has a wireless connection with a wireless local area network (WLAN) or a mobile communication network on the basis of the monitored use of the plurality of modems, a wireless connection with the WLAN having a first bandwidth state associated therewith and a wireless connection with the mobile communication network having a second, different, bandwidth state associated therewith;
   establish a communication operation of an application executing on the wireless device and a server remote from the wireless device based on capabilities associated with whichever of the first or second bandwidth state has been determined for the wireless connection and at least one rule for use in controlling communication between the application and the server;
   in response to a change in the use of the plurality of modems, notify an application on the wireless device of the change; and
   in response to said notification, cause the application to modify the communication operation on the basis of said change.

12. The non-transitory machine-readable storage medium of claim 11, wherein the sets of instructions, when executed by the machine, further cause the machine to communicate data indicative of the determined first or second bandwidth state associated with the wireless connection to the application.

13. The non-transitory machine-readable storage medium of claim 12, wherein the sets of instructions, when executed by the machine, further cause the machine to modify the communication operation based on the determined first or second bandwidth state associated with the wireless connection.

14. The non-transitory machine-readable storage medium of claim 13, wherein said modification comprises enabling synchronization of information between the wireless device and the server when the wireless connection is determined to be in the first bandwidth state.

15. The non-transitory machine-readable storage medium of claim 13, wherein said modification comprises disabling synchronization of information between the wireless device and the server when the wireless connection is determined to be in the second bandwidth state.

* * * * *